US007065490B1

(12) United States Patent
Asano et al.

(10) Patent No.: US 7,065,490 B1
(45) Date of Patent: Jun. 20, 2006

(54) VOICE PROCESSING METHOD BASED ON THE EMOTION AND INSTINCT STATES OF A ROBOT

(75) Inventors: Yasuharu Asano, Kanagawa (JP); Hongchang Pao, Tokyo (JP)

(73) Assignee: Sony Corporation, Tokyo (JP)

( * ) Notice: Subject to any disclaimer, the term of this patent is extended or adjusted under 35 U.S.C. 154(b) by 666 days.

(21) Appl. No.: 09/723,813

(22) Filed: Nov. 28, 2000

(30) Foreign Application Priority Data

Nov. 30, 1999 (JP) ............................... P11-340472

(51) Int. Cl.
*G10L 11/00* (2006.01)
*G10L 21/00* (2006.01)
*B25J 5/00* (2006.01)
*G05B 19/04* (2006.01)

(52) U.S. Cl. ...................... 704/275; 704/270; 704/231; 318/568.12; 700/246

(58) Field of Classification Search ................ 704/260, 704/231, 272, 1, 270, 258; 370/310; 707/1
See application file for complete search history.

(56) References Cited

U.S. PATENT DOCUMENTS 5,029,214 A 7/1991 Hollander
5,700,178 A 12/1997 Cimerman et al.
5,802,488 A * 9/1998 Edatsune .................... 704/231
5,860,064 A 1/1999 Henton
5,918,222 A * 6/1999 Fukui et al. ................... 707/1
6,160,986 A * 12/2000 Gabai et al. ................ 434/308
6,192,215 B1 * 2/2001 Wang ..................... 434/307 R
6,243,680 B1 * 6/2001 Gupta et al. ................ 704/260
6,446,056 B1 * 9/2002 Sadakuni ..................... 706/14
6,629,242 B1 * 9/2003 Kamiya et al. ............. 713/100
6,792,406 B1 * 9/2004 Fujimura et al. ........... 704/257
2002/0069036 A1 * 6/2002 Mizokawa .................. 702/182
2002/0194002 A1 * 12/2002 Petrushin .................... 704/270

FOREIGN PATENT DOCUMENTS

EP 0 730 261 9/1996
WO WO 97 41936 11/1997

OTHER PUBLICATIONS

P. Dario et al., Instinctive Behaviors and Personalities in Societies of Cellualr Robots1991, pp. 1927-1929.*

* cited by examiner

*Primary Examiner*—David Hudspeth
*Assistant Examiner*—Matthew J Sked
(74) *Attorney, Agent, or Firm*—Frommer Lawrence & Haug LLP; William S. Frommer

(57) ABSTRACT

An voice synthesizing unit performs voice synthesizing processing, based on the state of emotion of a robot at an emotion/instinct model unit. For example, in the event that the emotion state of the robot represents "not angry", synthesized sound of "What is it?" is generated at the voice synthesizing unit. On the other hand, in the event that the emotion state of the robot represents "angry", synthesized sound of "Yeah, what?" is generated at the voice synthesizing unit, to express the anger. Thus, a robot with a high entertainment nature is provided.

8 Claims, 15 Drawing Sheets

VOICE PROCESSING METHOD BASED ON THE EMOTION AND INSTINCT STATES OF A ROBOT

FIELD OF THE INVENTION

The present invention relates to an voice processing device, voice processing method, and recording medium, and particularly relates to an voice processing device, voice processing method, and recording medium suitably used for a robot having voice processing functions such as voice recognition, voice synthesizing, and so forth.

DESCRIPTION OF THE RELATED ART

Heretofore, many robots which output synthesized sound when a touch switch is pressed (the definition of such robots in the present specification includes stuffed animals and the like) have been marketed as toy products.

However, with conventional robots, the relation between the pressing operation of the touch switch and synthesized sound is fixed, so there has been the problem that the user gets tired of the robot.

SUMMARY OF THE INVENTION

The present invention has been made in light of such, and accordingly, it is an object thereof to provide a robot with a high entertainment factor.

To this end, the voice processing device according to the present invention comprises: voice processing means for processing voice; and control means for controlling voice processing by the voice processing means, based on the state of the robot.

The control means may control the voice process based on the state of actions, emotions or instincts of the robot. The voice processing means may comprise voice synthesizing means for performing voice synthesizing processing and outputting synthesized sound, and the control means may control the voice synthesizing processing by the voice synthesizing means, based on the state of the robot.

The control means may control phonemics information and pitch information of synthesized sound output by the voice synthesizing means, and the control means may also control the speech speed or volume of synthesized sound output by the voice synthesizing means.

The voice processing means may extract the pitch information or phonemics information of the input voice, and in this case, the emotion state of the robot may be changed based on the pitch information or phonemics information, or the robot may take actions corresponding to the pitch information or phonemics information.

The voice processing means may comprise voice recognizing means for recognizing input voice, and the robot may take actions corresponding to the reliability of the voice recognition results output from the voice recognizing means, or the emotion state of the robot may be changed based on the reliability.

The control means may recognize the action which the robot is taking, and control voice processing by the voice processing means based on the load regarding that action. Also, the robot may take actions corresponding to resources which can be appropriated to voice processing by the voice processing means.

The voice processing method according to the present invention comprises: an voice processing step for processing voice; and a control step for controlling voice processing in the voice processing step, based on the state of the robot.

The recording medium according to the present invention records programs comprising: an voice processing step for processing voice; and a control step for controlling voice processing in the voice processing step, based on the state of the robot.

With the voice processing device, voice processing method, and recording medium according to the present invention, voice processing is controlled based on the state of the robot.

DESCRIPTION OF THE PREFERRED EMBODIMENTS

Figure 1:
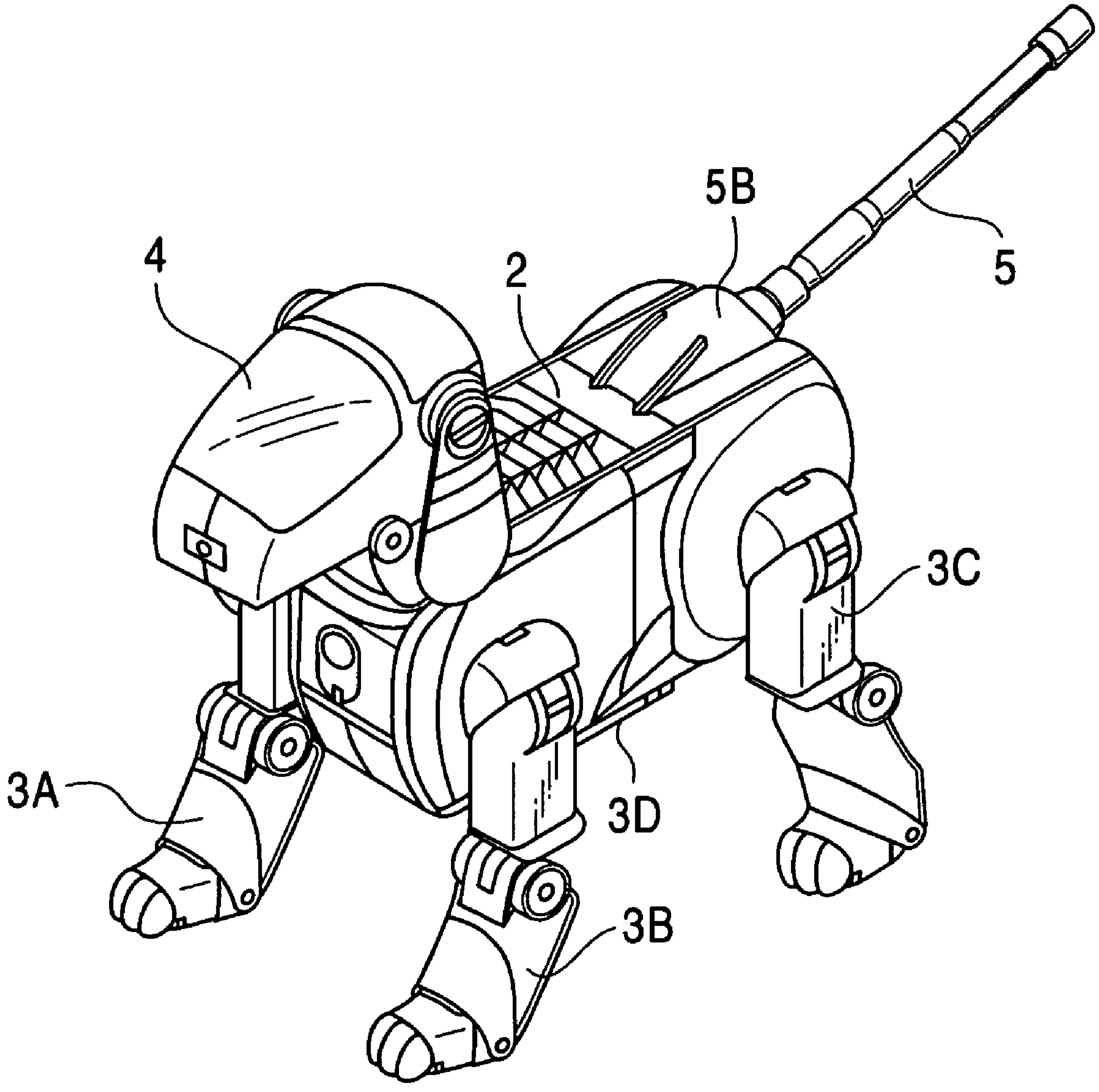
FIG. 1 is a perspective view illustrating an external configuration example of an embodiment of a robot to which the present invention has been applied.
Figure 2:
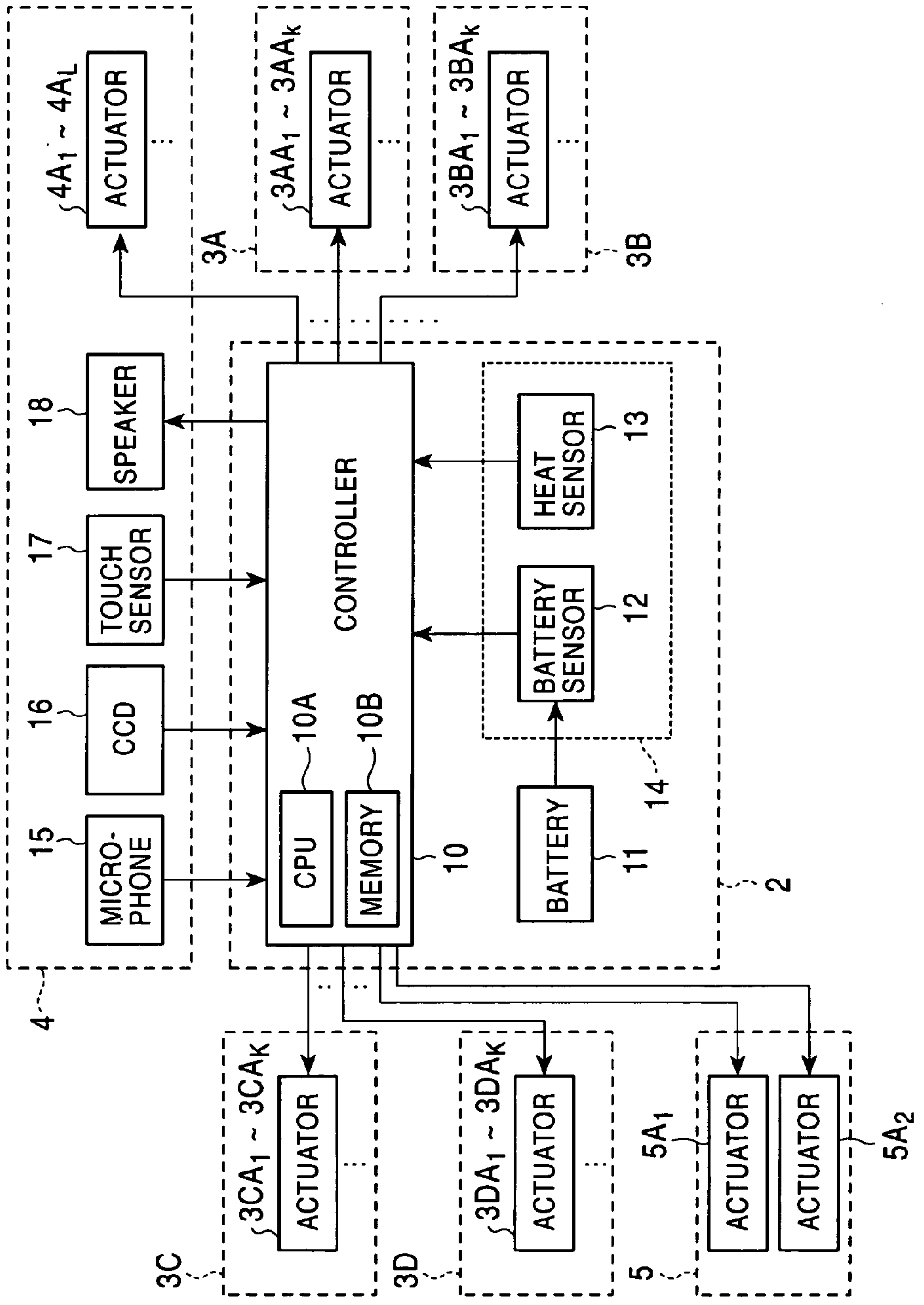
FIG. 2 is a block diagram illustrating an internal configuration example of the robot shown in FIG. 1.

FIG. 1 illustrates an external configuration example of an embodiment of a robot to which the present invention has been applied, and FIG. 2 illustrates an electrical configuration example thereof.

With the present embodiment, the robot is a dog-type robot, with leg units 3A, 3B, 3C, and 3D linked to a torso unit 2, at the front and rear right and left portions, and with a head unit 4 and tail unit 5 respectively linked to the front portion and rear portion of the torso unit 2.

The tail unit 5 is extracted from a base portion 5B provided to the upper plane of the torso unit 2 so as to be capable of bending or rocking with a certain degree of freedom.

Stored in the torso unit 2 are a controller 10 which performs control of the entire robot, a battery 11 which is the power source for the robot, an internal sensor unit 14 made up of a battery sensor 12 and thermal sensor 13, and so forth.

Positioned in the head unit 4 are a microphone 15 which serves as an "ear", a CCD (Charge Coupled Device) camera 16 which serves as an "eye", a touch sensor 17 which acts as the tactual sense, a speaker 18 serving as the "mouth", etc., at the respective positions.

Further, provided to the joint potions of the leg units 3A through 3D, the linkage portions of the leg units 3A through 3D to the torso unit 2, the linkage portion of the head unit 4 to the torso unit 2, the linkage portions of the tail unit 5 to the torso unit 2, etc., are actuators 3$AA_1$ through 3$AA_K$, 3$BA_1$ through 3$BA_K$, 3$CA_1$ through 3$CA_K$, 3$DA_1$ through 3$DA_K$, 4$A_1$ through 4$A_L$, 5$A_1$, and 5$A_2$, as shown in FIG. 2.

The microphone 15 in the head unit 4 collects surrounding voice (sounds) including speech of the user, and sends the obtained voice signals to the controller 10. The CCD camera 16 takes images of the surrounding conditions, and sends the obtained image signals to the controller 10.

The touch sensor 17 is provided at the upper portion of the head unit 4 for example, so as to detect pressure received by physical actions from the user such as "petting" or "hitting", and sends the detection results as pressure detection signals to the controller 10.

The battery sensor 12 in the torso unit 2 detects the remaining amount of the battery 11, and sends the detection results as remaining battery amount detection signals to the controller 10. The thermal sensor 13 detects heat within the robot, and sends the detection results as thermal detection signals to the controller 10.

The controller 10 has a CPU (Central Processing Unit) 10A and memory 10B and the like built in, and performs various types of processing by executing control programs stored in the memory 10B at the CPU 10A.

That is, the controller 10 judges surrounding conditions, commands from the user, actions performed upon the robot by the user, etc., or the absence thereof, based on voice signals, image signals, pressure detection signals, remaining battery amount detection signals, and thermal detection signals, from the microphone 15, CCD camera 16, touch sensor 17, battery sensor 12, and thermal sensor 13.

Further, based on the judgement results and the like, the controller 10 decides subsequent actions, and drives actuators necessary to this end from the actuators 3$AA_1$ through 3$AA_K$, 3$BA_1$ through 3$BA_K$, 3$CA_1$ through 3$CA_K$, 3$DA_1$ through 3$DA_K$, 4$A_1$ through 4$A_L$, 5$A_1$, and 5$A_2$, based on the decision results, thereby causing the robot to perform actions such as moving the head unit vertically or horizontally, moving the tail unit 5, driving the leg units 3A through 3D so as to cause the robot to take actions such as walking, and so forth.

Also, if necessary, the controller generates synthesized sound which is supplied to the speaker 18 and output, or unshown LEDs (Light-Emitting Diodes) provided at the position of the "eyes" of the robot to go on, off, or blink.

Thus, the robot is arranged so as to act in an autonomic manner, based on surrounding conditions and the like.

Figure 3:
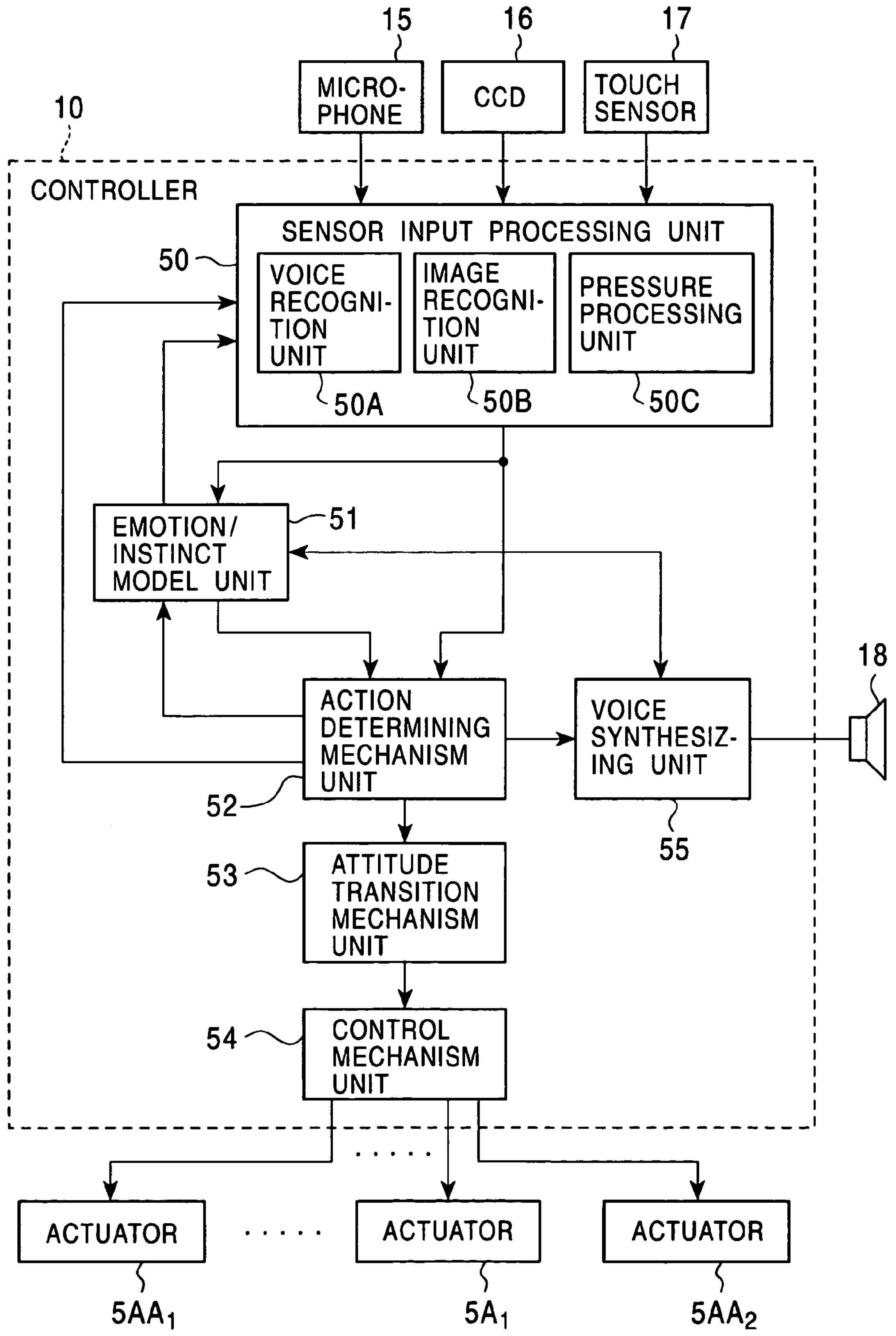
FIG. 3 is a block diagram illustrating a functional configuration example of the controller 10 shown in FIG. 2.

Next, FIG. 3 illustrates a functional configuration example of the controller shown in FIG. 2. The functional configuration shown in FIG. 3 is realized by the CPU 10A executing the control programs stored in the memory 10B.

The controller 10 comprises a sensor input processing unit 50 which recognizes specific external states, an emotion/instinct model unit 51 which accumulates the recognition results of the sensor input processing unit 50 and expresses the state of emotions and instincts, an action determining mechanism unit 52 which determines subsequent action based on the recognition results of the sensor input processing unit 50 and the like, an attitude transition mechanism unit 53 which causes the robot to actually take actions based on the determination results of the action determining mechanism unit 52, a control mechanism unit 54 which drives and controls the actuators 3$AA_1$ through 5$A_1$ and 5$A_2$, and an voice synthesizing unit 55 which generates synthesized sound.

The sensor input processing unit 50 recognizes certain external states, action performed on the robot by the user, instructions and the like from the user, etc., based on the voice signals, image signals, pressure detection signals, etc., provided from the microphone 15, CCD camera 16, touch sensor 17, etc., and notifies the state recognition information representing the recognition results to the emotion/instinct model unit 51 and action determining mechanism unit 52.

That is, the sensor input processing unit 50 has an voice recognizing unit 50A, and the recognizing unit 50A performs voice recognition following the control of the action determining mechanism unit 52 using the voice signals provided from the microphone 15, taking into consideration the information obtained from the emotion/instinct model unit 51 and action determining mechanism unit 52 as necessary. Then, the voice recognizing unit 50A notifies the emotion/instinct model unit 51 and action determining mechanism unit 52 of instructions and the like of the voice recognition results, such as "walk", "down", "chase the ball", for example, as state recognition information.

Also, the sensor input processing unit 50 has an image recognizing unit 50B, and the image recognizing unit 50B performs image recognition processing using image signals provided from the CCD camera 16. In the event that as a result of the processing the image recognizing unit 50B detects "a red round object" or "a plane vertical to the ground having a certain height or more", for example, image recognition results such as "there is a ball" or "there is a wall" are notified to the emotion/instinct model unit 51 and action determining mechanism unit 52, as state recognition information.

Further, the sensor input processing unit 50 has an pressure processing unit 50C, and the pressure processing unit 50C processes pressure detection signals provided from the touch sensor 17. Then, in the event that the pressure processing unit 50C detects, as the result of the processing, pressure of a certain threshold value or greater within a short time, the pressure processing unit 50C makes recognition of having been "struck (scolded)", while in the event that the pressure processing unit 50C detects pressure less than the threshold value over a long time, the pressure processing unit 50C makes recognition of having been "petted (praised) ". The recognition results thereof are notified to the emotion/instinct model unit 51 and action determining mechanism unit 52, as state recognition information.

Figure 4:
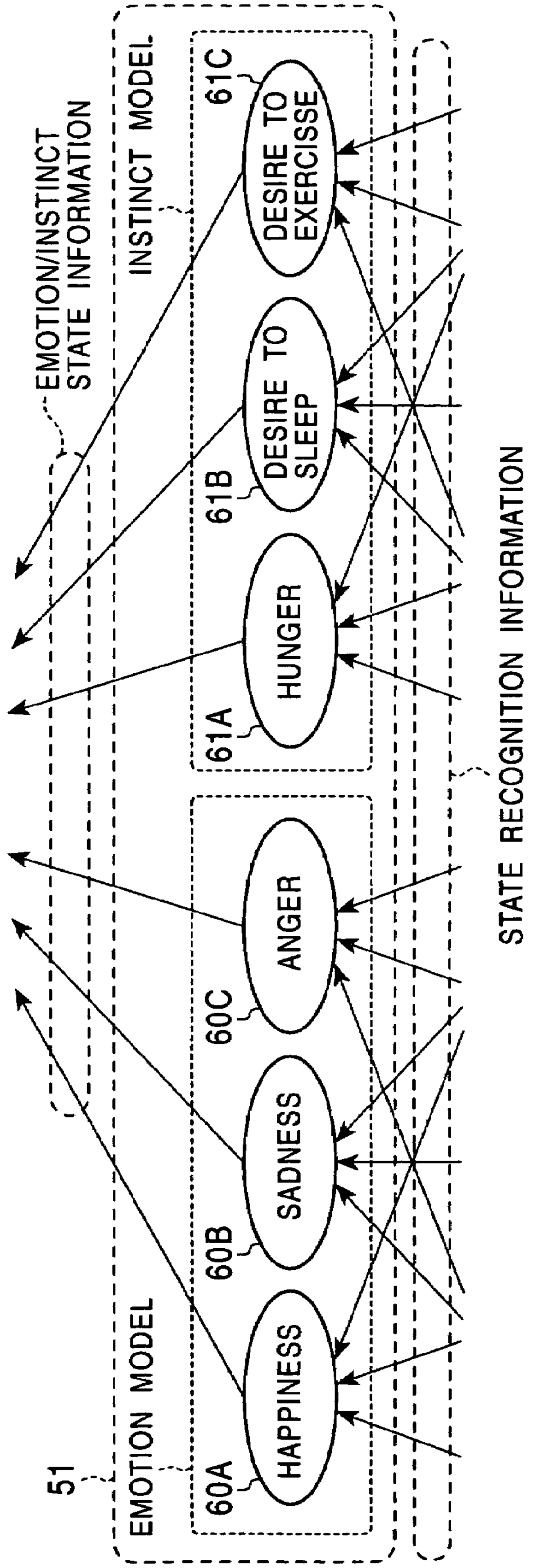
FIG. 4 is a diagram illustrating an emotion/instinct model.

The emotion/instinct model unit 51 manages both an emotion model and instinct model, representing the state of emotions and instincts of the robot, as shown in FIG. 4. Here, the emotion model and instinct model are stored in the memory 10B shown in FIG. 3.

The emotion model is made up of three emotion units 60A, 60B, and 60C, for example, and the emotion units 60A through 60C each represent the state (degree) of "happiness", "sadness", and "anger", with a value within the range of 0 to 100, for example. The values are each changed based on state recognition information from the sensor input processing unit 50, passage of time, and so forth.

Incidentally, an emotion unit corresponding to "fun" can be provided in addition to "happiness", "sadness", and "anger".

The instinct model is made up of three instinct units 61A, 61B, and 61C, for example, and the instinct units 61A through 61C each represent the state (degree) of "hunger", "desire to sleep", and "desire to exercise", from instinctive desires, with a value within the range of 0 to 100, for example. The values are each changed based on state recognition information from the sensor input processing unit 50, passage of time, and so forth.

The emotion/instinct model unit 51 outputs the state of emotion represented by the values of the emotion units 60A through 60C and the state of instinct represented by the values of the instinct units 61A through 61C as emotion/instinct state information, which change as described above, to the sensor input processing unit 50, action determining mechanism unit 52, and voice synthesizing unit 55.

Now, at the emotion/instinct model unit 51, the emotion units 60A through 60C making up the emotion model are linked in a mutually suppressing or mutually stimulating manner, such that in the event that the value of one of the emotion units changes, the values of the other emotion units change accordingly, thus realizing natural emotion change.

Figure 5A:
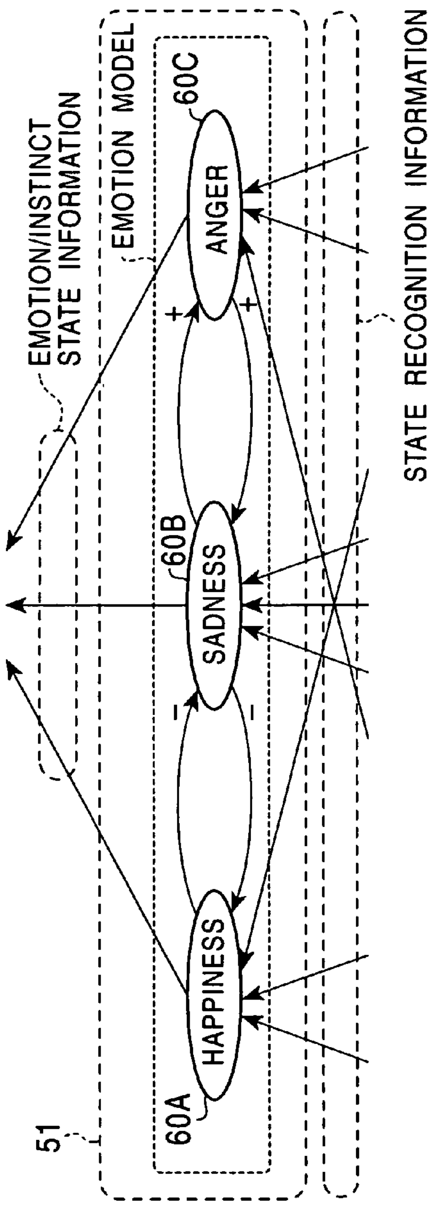
FIGS. 5A and 5B are diagrams describing the processing in the emotion/instinct model unit 51.

That is, for example, as shown in FIG. 5A, in the emotion model the emotion unit 60A representing "happiness" and the emotion unit 60B representing "sadness" are linked in a mutually suppressive manner, such that in the event that the robot is praised by the user, the value of the emotion unit 60A for "happiness" first increases. Further, in this case, the value of the emotion unit 60B for "sadness" decreases in a manner corresponding with the increase of the value of the emotion unit 60A for "happiness", even though state recognition information for changing the value of the emotion unit 60B for "sadness" has not been supplied to the emotion/instinct model unit 51. Conversely, in the event that the value of the emotion unit 60B for "sadness" increases, the value of the emotion unit 60A for "happiness" decreases accordingly.

Further, the emotion unit 60B representing "sadness" and the emotion unit 60C representing "anger" are linked in a mutually stimulating manner, such that in the event that the robot is struck by the user, the value of the emotion unit 60C for "anger" first increases. Further, in this case, the value of the emotion unit 60B for "sadness" increases in a manner corresponding with the increase of the value of the emotion unit 60C for "anger", even though state recognition information for changing the value of the emotion unit 60B for "sadness" has not been supplied to the emotion/instinct model unit 51. Conversely, in the event that the value of the emotion unit 60B for "sadness" increases, the value of the emotion unit 60C for "anger" increases accordingly.

Further, at the emotion/instinct model unit 51, the instinct units 61A through 61C making up the instinct model are also linked in a mutually suppressing or mutually stimulating manner, as with the above emotion model, such that in the event that the value of one of the instinct units changes, the values of the other instinct units change accordingly, thus realizing natural instinct change.

Also, in addition to state recognition information being supplied to the emotion/instinct model unit 51 from the sensor input processing unit 50, action information indicating current or past actions of the robot, i.e., representing the contents of actions, such as "walked for a long time" for example, are supplied from the action determining mechanism unit 52, so that event in the event that the same state recognition information is provided, different emotion/instinct state information is generated according to the actions of the robot indicated by the action information.

Figure 5B:
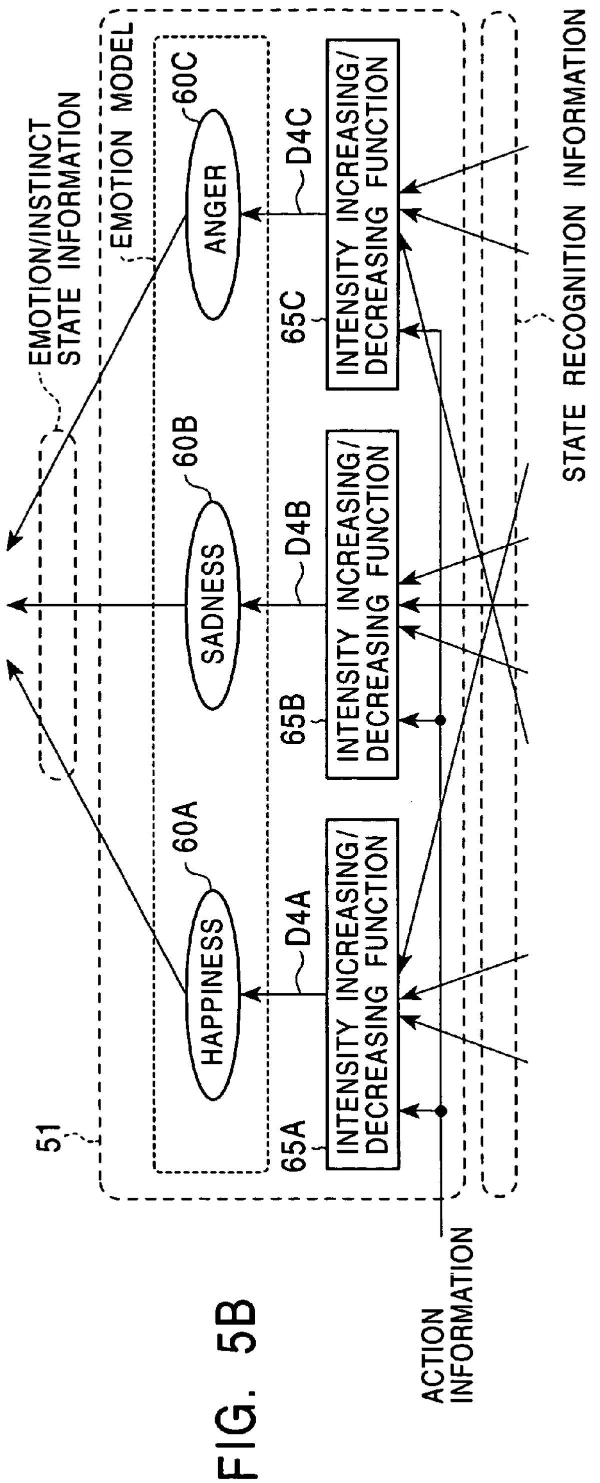

That is to say, as shown in FIG. 5B for example, with regard to the emotion model, intensity increasing/decreasing functions 65A through 65C for generating value information for increasing or decreasing the values of the emotion units 60A through 60C based on the action information and the state recognition information are each provided to the step preceding the emotion units 60A through 60C. The values of the emotion units 60A through 60C are each increased or decreased according to the values information output from the intensity increasing/decreasing functions 65A through 65C.

As a result, in the event that the robot greets the user and the user pets the robot on the head, for example, the action information of greeting the user and the state recognition information of having been pet on the head are provided to the intensity increasing/decreasing function 65A, and in this case, the value of the emotion unit 60A for "happiness" is increased at the emotion/instinct model unit 51.

On the other hand, in the event that the robot is petted on the head while executing a task of some sort, action information that a task is being executed and the state recognition information of having been pet on the head are provided to the intensity increasing/decreasing function 65A, but in this case, the value of the emotion unit 60A for "happiness" is not changed at the emotion/instinct model unit 51.

Thus, the emotion/instinct model unit 51 does not only make reference to the state recognition information, but also makes reference to action information indicating the past or present actions of the robot, and thus sets the values of the emotion units 60A through 60C. Consequently, in the event that the user mischievously pets the robot on the head while the robot is executing a task of some sort, a unnatural changes in emotions due to the value of the emotion unit 60A for "happiness" being increased can be avoided.

Further, regarding the instinct units 61A through 61C making up the instinct model, the emotion/instinct model unit 51 increases or decreases the values of each based on both state recognition information and action information in the same manner as with the case of the emotion model.

Now, the intensity increasing/decreasing functions 65A through 65C are functions which generate and output value information for changing the values of the emotions units 60A through 61C according to preset parameters, with the state recognition information and action information as input thereof, and setting these parameters to values differently for each robot would allow for individual characteristics for each robot, such as one robot being of a testy nature and another being jolly, for example.

Returning to FIG. 3, the action determining mechanism unit 52 decides the next action based on state recognition information from the sensor input processing unit 50 and emotion/instinct information from the emotion/instinct model unit 51, passage of time, etc., and the decided action contents are output to the attitude transition mechanism unit 53 as action instruction information.

Figure 6:
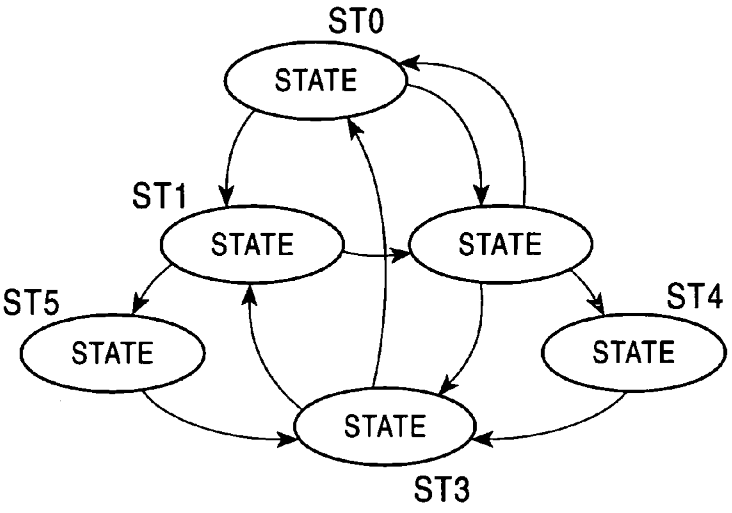
FIG. 6 is a diagram illustrating an action model.

That is, as shown in FIG. 6, the action determining mechanism unit 52 manages finite automatons wherein the actions of which the robot is capable of taking are corresponding to the state, as action models stipulating the actions of the robot. The state in the finite automaton serving as the action model is caused to make transition based on state recognition information from the sensor input processing unit 50, the values of the emotion model and instinct model at the emotion/instinct model unit 51, passage of time, etc., and actions corresponding to the state following the transition are determined to be the actions to taken next.

Specifically, for example, in FIG. 6, let us say that state ST3 represents an action of "standing", state ST4 represents an action of "lying on side", and state ST5 represents an action of "chasing a ball". Now, in the state ST5 for "chasing a ball" for example, in the event that state recognition information of "visual contact with ball has been lost" is supplied, the state makes a transition from state ST5 to state ST3, and consequently, the action of "standing" which corresponds to state ST3 is decided upon as the subsequent action. Also, in the event that the robot is in state ST4 for "lying on side" for example, and state recognition information of "Get up!" is supplied, the state makes a transition from state ST4 to state ST3, and consequently, the action of "standing" which corresponds to state ST3 is decided upon as the subsequent action.

Now, in the event that the action determining mechanism unit 52 detects a predetermined trigger, state transition is executed. That is to say, in the event that the time for the action corresponding to the current state has reached a predetermined time, in the event that certain state recognition information has been received, in the event that the value of the state of emotion (i.e., values of emotion units 60A through 60C) or the value of the state of instinct (i.e., values of instinct units 61A through 61C) represented by the emotion/instinct state information supplied from the emotion/instinct model unit 51 are equal to or less than, or are equal to or greater than a predetermined threshold value, etc., the action determining mechanism unit 52 causes state transition.

Note that the action determining mechanism unit 52 causes state transition of the finite automaton in FIG. 6 based not only state recognition information from the sensor input processing unit 50, but also based on values of the emotion model and instinct model from the emotion/instinct model unit 51, etc., so that event in the event that the same state recognition information is input, the destination of transition of the state differs according to the emotion model and instinct model (i.e., emotion/instinct information).

Consequently, in the event that the emotion/instinct state information indicates that the state is "not angry" and "not hungry", for example, and in the event that the state recognition information indicates "the palm of a hand being held out in front", the action determining mechanism unit 52 generates action instruction information for causing an action of "shaking hands" in accordance with the hand being held out in front, and this is sent to the attitude transition mechanism unit 53.

Also, in the event that the emotion/instinct state information indicates that the state is "not angry" and "hungry", for example, and in the event that the state recognition information indicates "the palm of a hand being held out in front", the action determining mechanism unit 52 generates action instruction information for causing an action of "licking the hand" in accordance with the hand being held out in front, and this is sent to the attitude transition mechanism unit 53.

Further, in the event that the emotion/instinct state information indicates that the state is "angry" for example, and in the event that the state recognition information indicates "the palm of a hand being held out in front", the action determining mechanism unit 52 generates action instruction information for causing an action of "looking the other way", regardless of whether the emotion/instinct information indicates "hungry" or "not hungry", and this is sent to the attitude transition mechanism unit 53.

Incidentally, the action determining mechanism unit 52 is capable of determining the speed of walking, the magnitude of movement of the legs and the speed thereof, etc., serving as parameters of action corresponding to the state to which transition has been made, based on the state of emotions and instincts indicated by the emotion/instinct state information supplied from the emotion/instinct model unit 51.

Also, in addition to action instruction information for causing movement of the robot head, legs, etc., the action determining mechanism unit 52 generates action instruction information for causing speech by the robot, and action instruction information for causing the robot to execute speech recognition. The action instruction information for causing speech by the robot is supplied to the voice synthesizing unit 55, and the action instruction information supplied to the voice synthesizing unit 55 contains text and the like corresponding to the synthesized sound to be generated by the voice synthesizing unit 55. Once the voice synthesizing unit 55 receives the action instruction information from the action determining mechanism unit 52, synthesized sound is generated based on the text contained in the action instruction information while adding in the state of emotions and the state of instructs managed by the emotion/instinct model unit 51, and the synthesized sound is supplied to and output from the speaker 18. Also, the action instruction information for causing the robot to execute speech recognition is supplied to the voice recognizing unit 50A of the sensor input processing unit 50, and upon receiving such action instruction information, the voice recognizing unit 50A performs voice recognizing processing.

Further, the action determining mechanism unit 52 is arranged so as to supply the same action information supplied to the emotion/instinct model unit 51, to the sensor input processing unit 50 and the voice synthesizing unit 55. The voice recognizing unit 50A of the sensor input processing unit 50 and the voice synthesizing unit 55 each perform voice recognizing and voice synthesizing, adding in the action information from the action determining mechanism unit 52. This point will be described later.

The attitude transition mechanism unit 53 generates attitude transition information for causing transition of the attitude of the robot from the current attitude to the next attitude, based on the action instruction information from the action determining mechanism unit 52, and outputs this to the control mechanism unit 54.

Now, a next attitude to which transition can be made from the current attitude is determined by, e.g., the physical form of the robot such as the form, weight, and linkage state of the torso and legs, for example, and the mechanism of the actuators 3$AA_1$ through 5$A_1$ and 5$A_2$ such as the direction and angle in which the joints will bend, and so forth.

Also, regarding the next attitude, there are attitudes to which transition can be made directly from the current attitude, and attitudes to which transition cannot be directly made from the current attitude. For example, a quadruped robot in a state lying on its side with its legs straight out can directly make transition to a state of lying prostrate, but cannot directly make transition to a state of standing, so there is the need to first draw the legs near to the body and change to a state of lying prostrate, following which the robot stands up, i.e., actions in two stages are necessary. Also, there are attitudes to which transition cannot be made safely. For example, in the event that a quadruped robot in an attitude of standing on four legs attempts to raise both front legs, the robot will readily fall over.

Accordingly, the attitude transition mechanism unit 53 registers beforehand attitudes to which direct transition can be made, and in the event that the action instruction information supplied from the action determining mechanism unit 52 indicates an attitude to which direct transition can be made, the action instruction information is output without change as attitude transition information to the control mechanism unit 54. On the other hand, in the event that the action instruction information indicates an attitude to which direct transition cannot be made, the attitude transition mechanism unit 53 first makes transition to another attitude to which direct transition can be made, following which attitude transition information is generated for causing transition to the object attitude, and this information is sent to the to the control mechanism unit 54. Thus, incidents wherein the robot attempts to assume attitudes to which transition is impossible, and incidents wherein the robot falls over, can be prevented.

Figure 7:
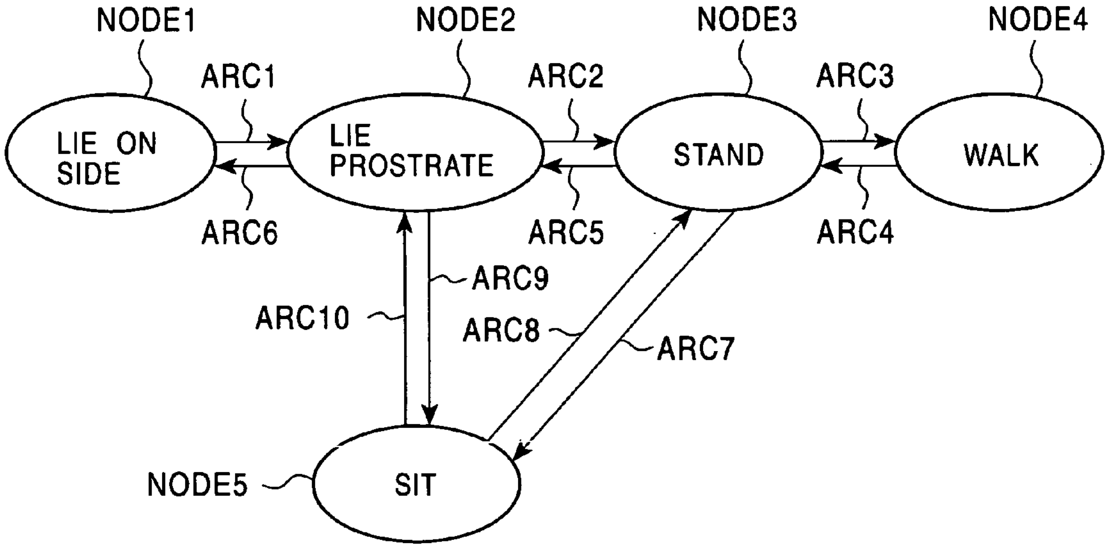
FIG. 7 is a diagram for describing the processing of the attitude transition mechanism unit 54.

That is to say, as shown in FIG. 7 for example, the attitude transition mechanism unit 53 stores an oriented graph wherein the attitudes which the robot can assume are represented as nodes NODE 1 through NODE 5, and nodes corresponding to two attitudes between which transition can be made are linked by oriented arcs ARC 1 through ARC 10, thereby generating attitude transition information such as described above, based on this oriented graph.

Specifically, in the event that action instruction information is supplied from the action determining mechanism unit 52, the attitude transition mechanism unit 53 searches a path from the current node to the next node by following the direction of the oriented arc connecting the node corresponding to the current attitude and the node corresponding to the next attitude to be assumed which the action instruction information indicates, thereby generating attitude transition information wherein attitudes corresponding to the nodes on the searched path are assumed.

Consequently, in the event that the current attitude is the node NODE 2 which indicates the attitude of "lying prostrate" for example, and action instruction information of "sit" is supplied, the attitude transition mechanism unit 53 generates attitude transition information corresponding to "sit", since direct transition can be made from the NODE 2 which indicates the attitude of "lying prostrate" to the node NODE 5 which indicates the attitude of "sitting" in the oriented graph, and this information is provided to the control mechanism unit 54.

Also, in the event that the current attitude is the node NODE 2 which indicates the attitude of "lying prostrate", and action instruction information of "walk" is supplied, the attitude transition mechanism unit 53 searches a path from the NODE 2 which indicates the attitude of "lying prostrate" to the node NODE 4 which indicates the attitude of "walking", in the oriented graph. In this case, the path obtained is NODE 2 which indicates the attitude of "lying prostrate", NODE 3 which indicates the attitude of "standing", and NODE 4 which indicates the attitude of "walking", so the attitude transition mechanism unit 53 generates attitude transition information in the order of "standing", and "walking", which is sent to the control mechanism unit 54.

The control mechanism unit 54 generates control signals for driving the actuators $3AA_1$ through $5A_1$ and $5A_2$ according to the attitude transition information from the attitude transition mechanism unit 53, and sends this information to the actuators $3AA_1$ through $5A_1$ and $5A_2$. Thus, the actuators $3AA_1$ through $5A_1$ and $5A_2$ are driven according to the control signals, and the robot acts in an autonomic manner.

Figure 8:
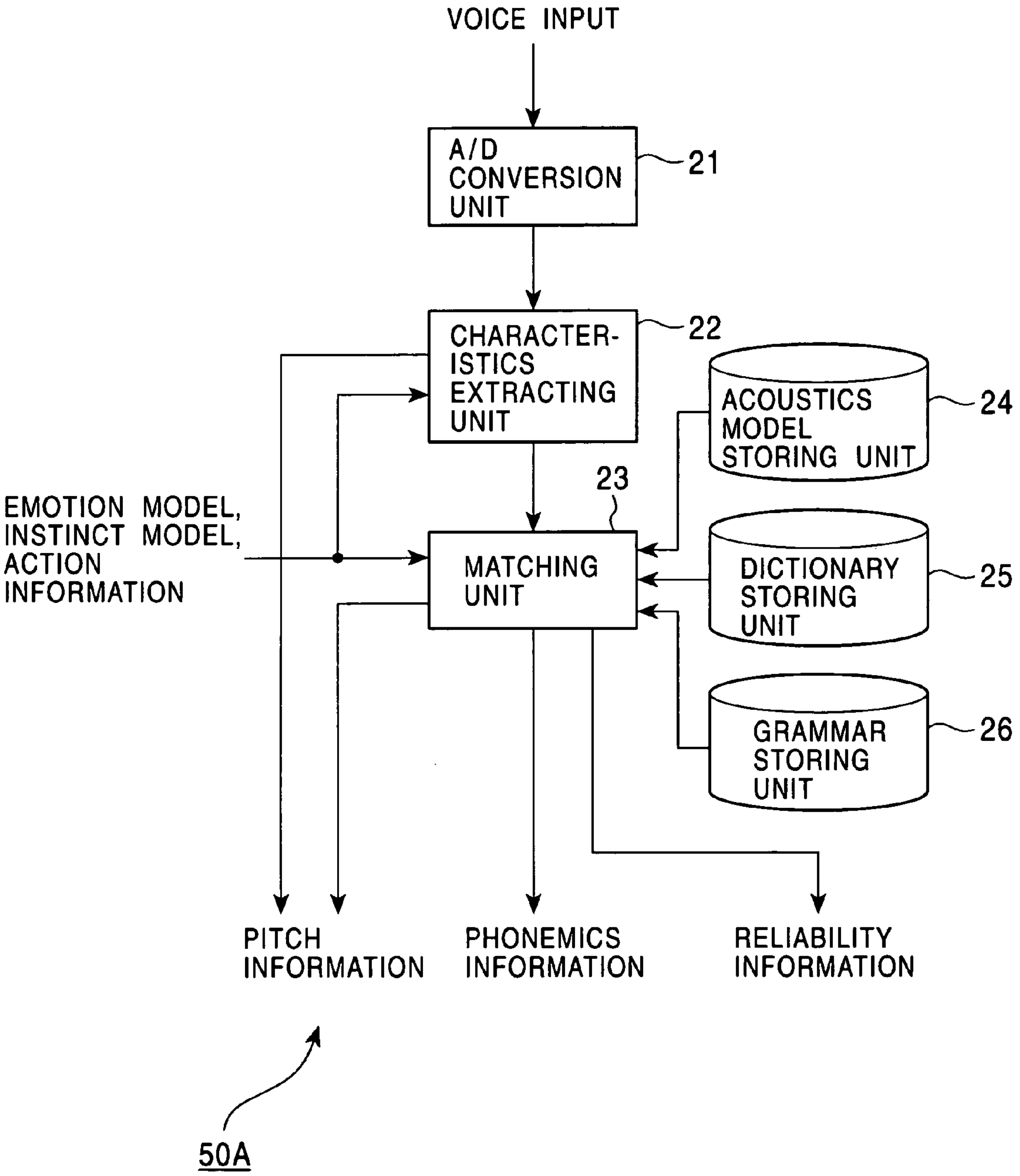
FIG. 8 is a block diagram illustrating a configuration example of the voice recognizing unit 50A.

Next, FIG. 8 illustrates a configuration example of the voice recognizing unit 50A shown in FIG. 3.

Audio signals from the microphone 15 are supplied to an A/D (Analog/Digital) converting unit 21. At the A/D converting unit 21, the analog voice signals from the microphone 15 are sampled and quantized, and subjected to A/D conversion into digital voice signal data. This voice data is supplied to a characteristics extracting unit 22.

The characteristics extracting unit 22 performs MFCC (Mel Frequency Cepstrum Coefficient) analysis for example for each appropriate frame of the input voice data, and outputs the analysis results to the matching unit 23 as characteristics parameters (characteristics vectors). Incidentally, at the characteristics extracting unit 22, characteristics extracting can be performed otherwise, such as extracting linear prediction coefficients, cepstrum coefficients, line spectrum sets, power for predetermined frequency bands (filter bank output), etc., as characteristics parameters.

Also, the characteristics extracting unit 22 extracts pitch information from the voice data input thereto. That is, the characteristics extracting unit 22 performs auto-correlation analysis for example of the voice data for example, thereby extracting pitch information of information and the like relating to the pitch frequency, power (amplitude), intonation, etc., of the voice input to the microphone 15.

The matching unit 23 performs voice recognition of the voice input to the microphone 15 (i.e., the input voice) using the characteristics parameters from the characteristics extracting unit 22 based on continuous distribution HMM (Hidden Markov Model) for example, while making reference to the acoustics model storing unit 24, dictionary storing unit 25, and grammar storing unit 26, as necessary.

That is to say, the acoustics model storing unit 24 stores acoustics models representing acoustical characteristics such as individual phonemes and syllables in the language of the voice which is to be subjected to voice recognition. Here, voice recognition is performed based on the continuous distribution HMM method, so the HMM (Hidden Markov Model) is used as the acoustics model. The dictionary storing unit 25 stores word dictionaries describing information relating to the pronunciation (i.e., phonemics information) for each word to be recognized. The grammar storing unit 26 stores syntaxes describing the manner in which each word registered in the word dictionary of the dictionary storing unit 25 concatenate (connect). The syntax used here may be rules based on context-free grammar (CFG), stochastic word concatenation probability (N-gram), and so forth.

The matching unit 23 connects the acoustic models stored in the acoustics model storing unit 24 by making reference to the word dictionaries stored in the dictionary storing unit 25, thereby configuring word acoustic models (word models). Further, the matching unit 23 connects multiple word models by making reference to the syntaxes stored in the grammar storing unit 26, and recognizes the speech input from the microphone 15 using the word models thus connected, based on the characteristics parameters, by continuous distribution HMM. That is to say, the matching unit 23 detects a word model sequence with the highest score (likelihood) of observation of the time-sequence characteristics parameters output by the characteristics extracting unit 22, and the phonemics information (reading) of the word string correlating to the word model sequence is output as the voice recognition results.

That is to say, the matching unit 23 accumulates the emergence probability of each of the characteristics parameters regarding word strings corresponding to the connected word models, and with the accumulated value as the score thereof, outputs the phonemics information of the word string with the highest score from the voice recognition results.

Further, the matching unit 23 outputs the score of the voice recognizing results as reliability information representing the reliability of the voice recognizing results.

Also, the matching unit 23 detects the duration of each phoneme and word making up the voice recognizing results which is obtained along with score calculation such as described above, and outputs this as phonemics information of the voice input to the microphone 15.

The recognition results of the voice input to the microphone 15, the phonemics information, and reliability information, output as described above, are output to the emotion/instinct model unit 51 and action determining mechanism unit 52, as state recognition information.

The voice recognizing unit 50A configured as described above is subjected to control of voice recognition processing based on the state of emotions and instincts of the robot, managed by the emotion/instinct model unit 51. That is, the state of emotions and instincts of the robot managed by the emotion/instinct model unit 51 are supplied to the characteristics extracting unit 22 and the matching unit 23, and the characteristics extracting unit 22 and the matching unit 23 change the processing contents based on the state of emotions and instincts of the robot supplied thereto.

Figure 9:
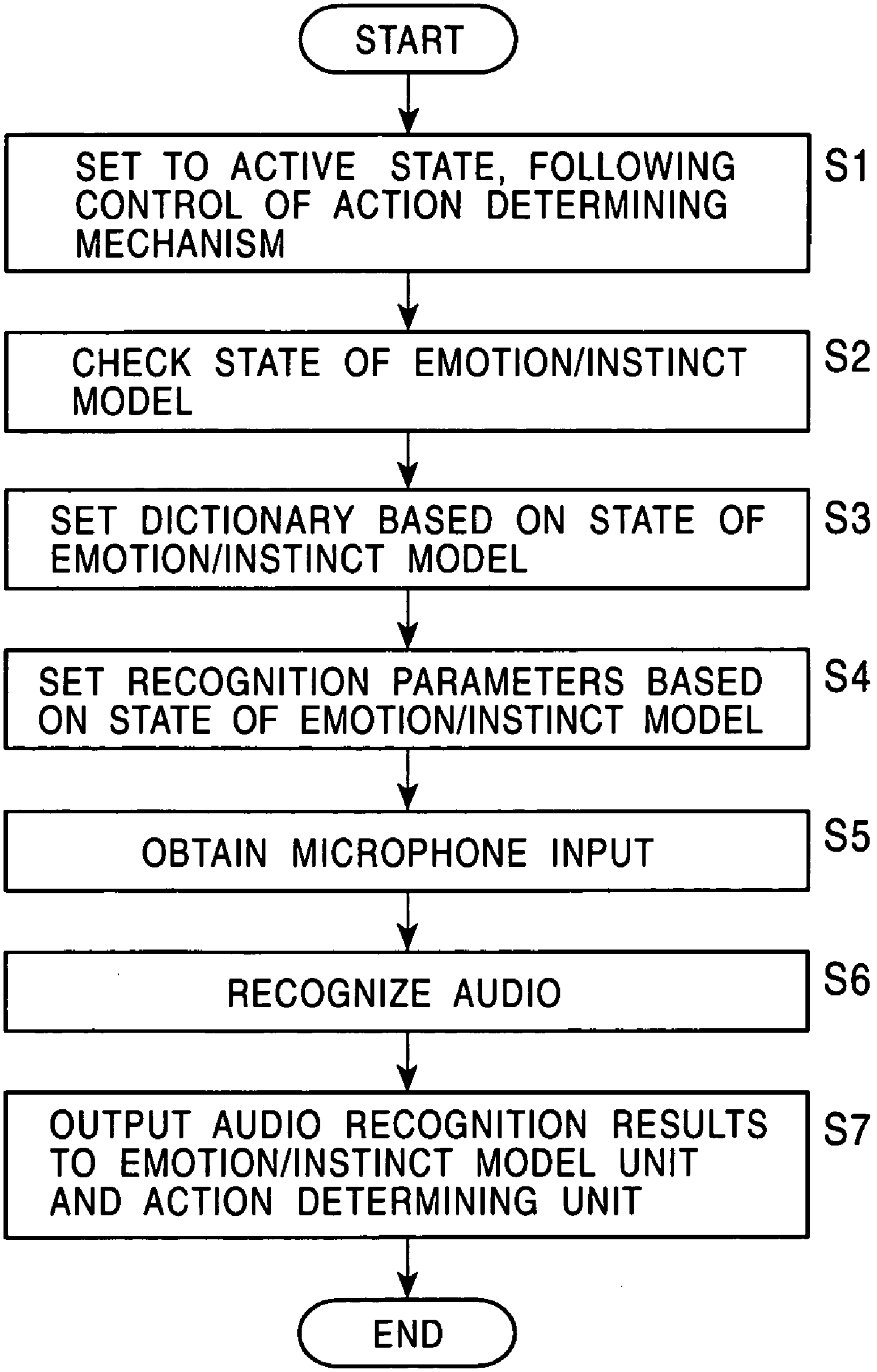
FIG. 9 is a flowchart describing the processing of the voice recognizing unit 50A.

Specifically, as shown in the flowchart in FIG. 9, once action instruction information instructing voice recognition processing is transmitted from the action determining mechanism unit 52, the action instruction information is received in step S1, and the blocks making up the voice recognizing unit 50A are set to an active state. Thus, the voice recognizing unit 50A is set in a state capable of accepting the voice that has been input to the microphone 15.

Incidentally, the blocks making up the voice recognizing unit 50A may be set to an active state at all times. In this case, an arrangement may be made for example wherein the processing from step S2 on in FIG. 9 is started at the voice recognizing unit 50A each time the state of emotions and instincts of the robot managed by the emotion/instinct model unit 51 changes.

Subsequently, the characteristics extracting unit 22 and the matching unit 23 recognize the state of emotions and instincts of the robot by making reference to the emotion/instinct model unit 51 in step S2, and the flow proceeds to step S3. In step S3, the matching unit 23 sets word dictionaries to be used for the above-described score calculating (matching), based on the state of emotions and instincts.

That is to say, here, the dictionary storing unit 25 divides the words which are to be the object of recognition into several categories, and stores multiple word dictionaries with words registered for each category. In step S3, word dictionaries to be used for voice recognizing are set based on the state of emotions and instincts of the robot.

Specifically, in the event that there is a word dictionary with the word “shake hands” registered in the dictionary storing unit 25 and also a word dictionary without the word “shake hands” registered therein, and in the event that the state of emotion of the robot represents “pleasant”, the word dictionary with the word “shake hands” registered therein is used for voice recognizing. However, in the event that the state of emotion of the robot represents “cross”, the word dictionary with the word “shake hands” not registered therein is used for voice recognizing. Accordingly, in the event that the state of emotion of the robot is pleasant, the speech “shake hands” is recognizes, and the voice recognizing results thereof are supplied to the action determining mechanism unit 52, thereby causing the robot to take action corresponding to the speech “shake hands” as described above. On the other hand, in the event that the results show that the robot is cross, the speech “shake hands” is not recognized (or erroneously recognized), so the robot makes to response thereto (or takes actions unrelated to the speech “shake hands”).

Incidentally, the arrangement here is such that multiple word dictionaries are prepared, and the word dictionaries to be used for voice recognizing are selected based on the state of emotions and instincts of the robot, but other arrangements may be made, such as an arrangement for example wherein just one word dictionary is provided and words to serve as the object of voice recognizing are selected from the word dictionary, based on the state of emotions and instincts of the robot.

Following the processing of step S3, the flow proceeds to step S4, and the characteristics extracting unit 22 and the matching unit 23 set the parameters to be used for voice recognizing processing (i.e., recognition parameters), based on the state of emotions and instincts of the robot.

That is, for example, in the event that the emotion state of the robot indicates “angry” or the instinct state of the robot indicates “sleepy”, the characteristics extracting unit 22 and the matching unit 23 set the recognition parameters such that the voice recognition precision deteriorates. On the other hand, in the event that the emotion state of the robot indicates “pleasant”, the characteristics extracting unit 22 and the matching unit 23 set the recognition parameters such that the voice recognition precision improves.

Now, recognition parameters which affect the voice recognition precision include, for example, threshold values compared with the voice input to the microphone 15, used in detection of voice sections, and so forth.

Subsequently, the flow proceeds to step S5, wherein the voice input to the microphone 15 is taken into the characteristics extracting unit 22 via the A/D converting unit 21, and the flow proceeds to step S6. At step S6, the above-described processing is performed at the characteristics extracting unit 22 and the matching unit 23 under the settings made in step S3 and S4, thereby executing voice recognizing of the voice input to the microphone 15. Then, the flow proceeds to step S7, and the phonemics information, pitch information, and reliability information, which are the voice recognition results obtained by the processing in step S6, are output to the emotion/instinct model unit 51 and action determining mechanism unit 52 as state recognition information, and the processing ends.

Upon receiving such state recognition information from the voice recognizing unit 50A, the emotion/instinct model unit 51 changes the values of the emotion model and instinct model as described with FIG. 5 based on the state recognition information, thereby changing the state of emotions and the state of instincts of the robot.

That is, for example, in the event that the phonemics information serving as the voice recognition results in the state recognition information is, “Fool!”, the emotion/instinct model unit 51 increases the value of the emotion unit 60C for “anger”. Also, the emotion/instinct model unit 51 changes the values information output by the increasing/decreasing functions 65A through 65C, based on pitch frequency serving as the phonemics information in the state recognition information, and the power and duration thereof, thereby changing the values of the emotion model and instinct model.

Also, in the event that the reliability information in the state recognition information indicates that the reliability of the voice recognition results is low, the emotion/instinct model unit 51 increases the value of the emotion unit 60B for "sadness", for example. On the other hand, in the event that the reliability information in the state recognition information indicates that the reliability of the voice recognition results is high, the emotion/instinct model unit 51 increases the value of the emotion unit 60A for "happiness", for example.

Upon receiving the state recognition information from the voice recognizing unit 50A, the action determining mechanism unit 52 determines the next action of the robot based on the state recognition information, and generates action instruction information for representing that action.

That is to say, the action determining mechanism unit 52 determines an action to take corresponding to the phonemics information of the voice recognizing results in the state recognizing information as described above, for example (e.g., determines to shake hands in the event that the voice recognizing results are "shake hands").

Or, in the event that the reliability information in the state recognizing information indicates that the reliability of the voice recognizing results is low, the action determining mechanism unit 52 determines to take an action such as cocking the head or acting apologetically, for example. On the other hand, in the event that the reliability information in the state recognizing information indicates that the reliability of the voice recognizing results is high, the action determining mechanism unit 52 determines to take an action such as nodding the head, for example. In this case, the robot can indicate to the user the degree of understanding of the speech of the user.

Next, action information indicating the contents of current or past actions of the robot are supplied from the action determining mechanism unit 52 to the voice recognizing unit 50A, as described above, and the voice recognizing unit 50A can be arranged to perform control of the voice recognizing processing based on the action information. That is, the action information output from the action determining mechanism unit 52 is supplied to the characteristics extracting unit 22 and the matching unit 23, and the characteristics extracting unit 22 and the matching unit 23 can be arranged to change the processing contents based on the action information supplied thereto.

Figure 10:
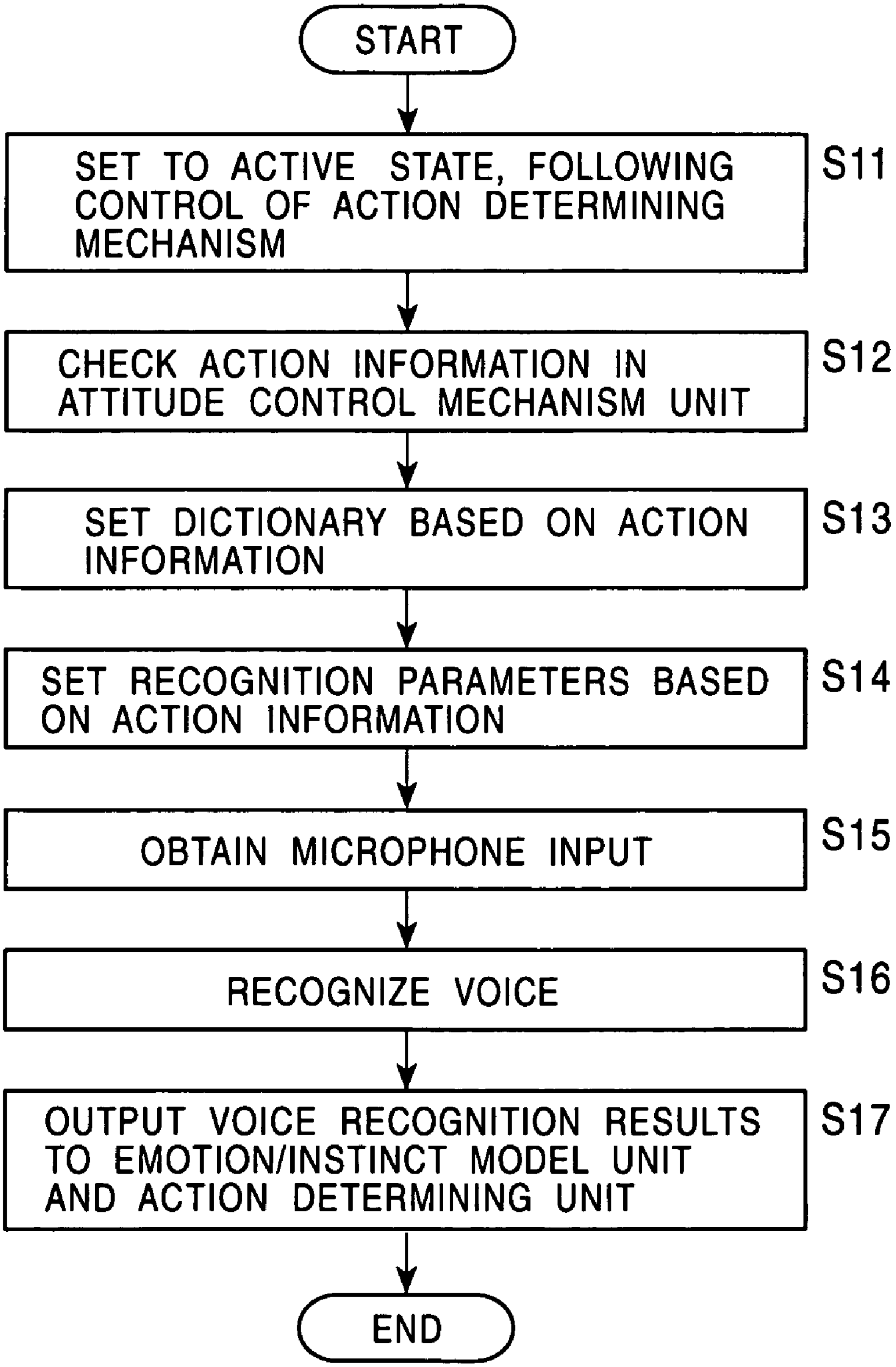
FIG. 10 is also a flowchart describing the processing of the voice recognizing unit 50A.

Specifically, as shown in the flowchart in FIG. 10, upon action instruction information instructing the voice recognizing processing being transmitted from the action determining mechanism unit 52, the action instruction information is received at the voice recognizing unit 50A in step S11 in the same manner as that of step S1 in FIG. 9, and the blocks making up the voice recognizing unit 50A are set to an active state.

Incidentally, as described above, the blocks making up the voice recognizing unit 50A may be set to an active state at all times. In this case, an arrangement may be made for example wherein the processing from step S12 on in FIG. 10 is started at the voice recognizing unit 50A each time the action information output from the action determining mechanism unit 52 changes.

Subsequently, the characteristics extracting unit 22 and the matching unit 23 make reference to the action information output from the action determining mechanism unit 52 in step S12, and the flow proceeds to step S13. In step S13, the matching unit 23 sets word dictionaries to be used for the above-described score calculating (matching), based on the action information.

That is, for example, in the event that the action information represents the current action to be "sitting" or "lying on side", it is basically inconceivable that the user would say, "Sit!" to the robot. Accordingly, the matching unit 23 sets the word dictionaries of the dictionary storing unit 25 so that the word "Sit!" is excluded from the object of speech recognition, in the event that the action information represents the current action to be "sitting" or "lying on side". In this case, no speech recognition is made regarding the speech "Sit!". Further, in this case, the number of words which are the object of speech recognition decrease, thereby enabling increased processing speeds and improved recognition precision.

Following the processing of step S13, the flow proceeds to step S14, and the characteristics extracting unit 22 and the matching unit 23 set the parameters to be used for voice recognition processing (i.e., recognition parameters) based on the action information.

That is, in the event that the action information represents "walking", for example, the characteristics extracting unit 22 and the matching unit 23 sets the recognition parameters such that priority is given to precision over processing speed, as compared to cases wherein the action information represents "sitting" or "lying prostrate", for example.

On the other hand, in the event that the action information represents "sitting" or "lying prostrate", for example, the recognition parameters are set such that priority is given to processing speed over precision, as compared to cases wherein the action information represents "walking", for example.

In the event that the robot is walking, the noise level from the driving of the actuators 3$AA_1$ through 5$A_1$ and 5$A_2$ is higher than in the case of sitting or lying prostrate, and generally, the precision of voice recognition deteriorates due to the effects of the noise. Thus, setting the recognition parameters such that priority is given to precision over processing speed in the event that the robot is walking allows deterioration of voice recognition precision, due to the noise, to be prevented (reduced).

On the other hand, in the event that the robot is sitting or lying prostrate, there is no noise from the above actuators 3$AA_1$ through 5$A_1$ and 5$A_2$, so there is no deterioration of voice recognition precision due to the driving noise. Accordingly, setting the recognition parameters such that priority is given to processing speed over precision in the event that the robot is sitting or lying prostrate allows the processing speed of voice recognition to be improved, while maintaining a certain level of voice recognition precision.

Now, as for recognition parameters which affect the precision and processing speed of voice recognition, there is for example the hypothetical range in the event of restricting the range serving as the object of score calculation by the Beam Search method at the matching unit 23 (i.e., the beam width for the beam search), and so forth.

Subsequently, the flow proceeds to step S15, the voice input to the microphone 15 is taken into the characteristics extracting unit 22 via the A/D converting unit 21, and the flow proceeds to step S16. At step S16, the above-described processing is performed at the characteristics extracting unit 22 and the matching unit 23 under the settings made in step S13 and S14, thereby executing voice recognizing of the voice input to the microphone 15. Then, the flow proceeds to step S17, and the phonemics information, pitch information, and reliability information, which are the voice recognition results obtained by the processing in step S16, are output to the emotion/instinct model unit 51 and action determining mechanism unit 52 as state recognition information, and the processing ends.

Upon receiving such state recognition information from the voice recognizing unit 50A, the emotion/instinct model unit 51 and action determining mechanism unit 52 change the values of the emotion model and instinct model as described above based on the state recognition information, and determining the next action of the robot.

Also, though the above arrangement involves setting the recognition parameters such that priority is given to precision over processing speed in the event that the robot is walking, since the effects of noise from the driving of the actuators 3$AA_1$ through 5$A_1$ and 5$A_2$ cause the precision of voice recognition to deteriorate, thereby preventing deterioration of voice recognition precision due to the noise, but an arrangement may be made wherein in the event that the robot is walking, the robot is caused to temporarily stop to perform voice recognition, an prevention deterioration of voice recognition precision can be realized with such a arrangement, as well.

Figure 11:
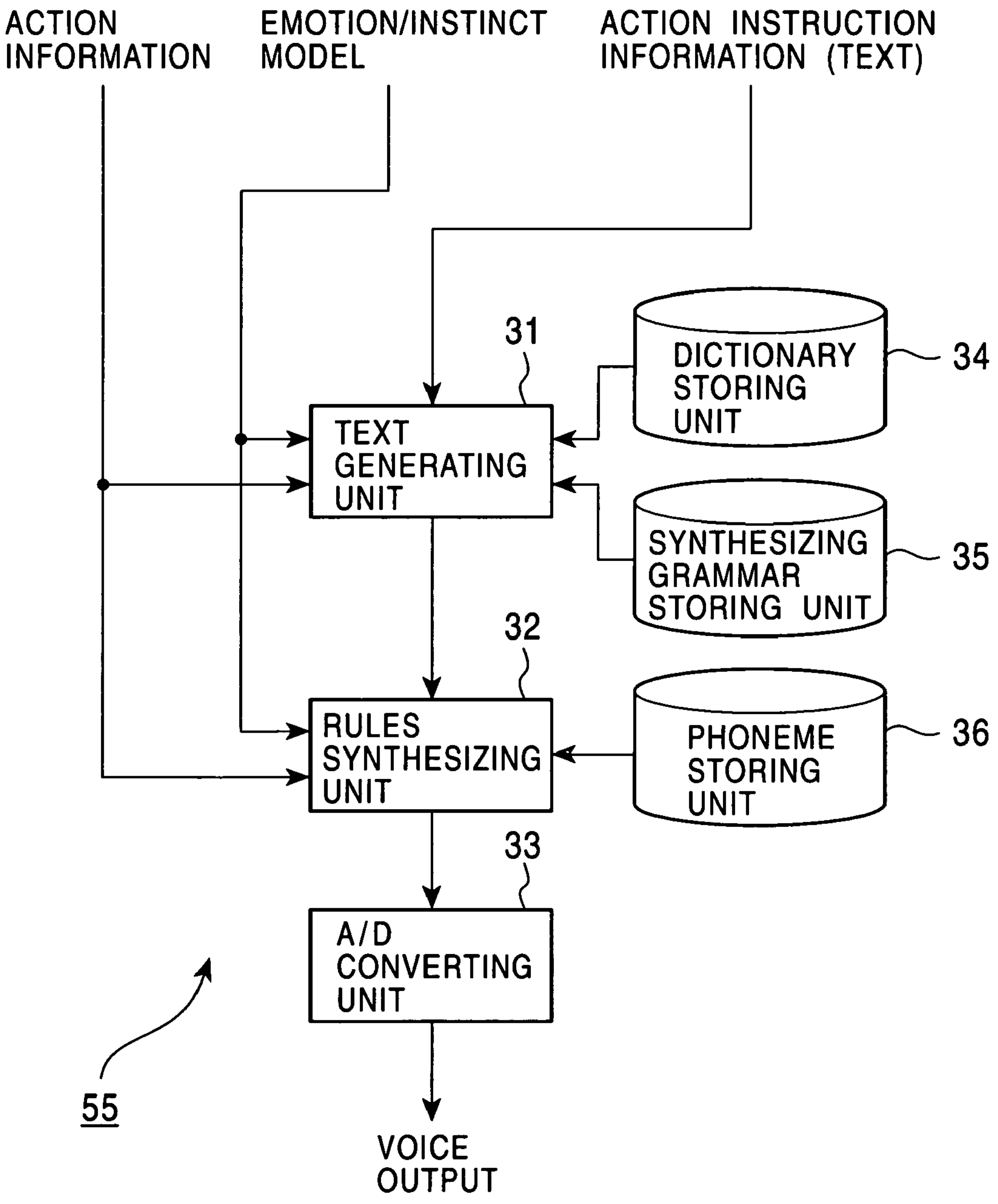
FIG. 11 is a block diagram illustrating a configuration example of the voice synthesizing unit 55.

Next, FIG. 11 illustrates a configuration example of the voice synthesizing unit 55 shown in FIG. 3.

The action instruction information containing text which output by the action determining mechanism unit 52 which is the object of voice synthesizing is supplied to the text generating unit 31, and the text generating unit 31 analyzes the text contained in the action instruction information, making reference to the dictionary storing unit 34 and analyzing grammar storing unit 35.

That is, the dictionary storing unit 34 has stored therein word dictionaries describing part of speech information for each word, reading, accentuation, and other information thereof. Also, the analyzing grammar storing unit 35 stores analyzing syntaxes relating to restrictions of word concatenation and the like, regarding the words described in the word dictionaries in the dictionary storing unit 34. Then, the text generating unit 31 performs morpheme analysis and grammatical structure analysis of the input text based on the word dictionaries and analyzing syntaxes, and extracts information necessary to the rule voice synthesizing performed by the latter rules synthesizing unit 32. Here, examples of information necessary for rule voice synthesizing include pause positions, pitch information such as information for controlling accents and intonation, phonemics information such as the pronunciation and the like of each word, and so forth.

The information obtained at the text generating unit 31 is then supplied to the rules synthesizing unit 32, and at the rules synthesizing unit 32, voice data (digital data) of synthesized sounds corresponding to the text input to the text generating unit 31 is generated using the phoneme storing unit 36.

That is, phoneme data in the form of CV (Consonant, Vowel), VCV, CVC, etc., is stored in the phoneme storing unit 36, so the rules synthesizing unit 32 connects the necessary phoneme data based on the information from the text generating unit 31, and further adds pauses, accents, intonation, etc., in an appropriate manner, thereby generating voice data of synthesized sound corresponding to the text input to the text generating unit 31.

This voice data is supplied to the D/A (Digital/Analog) converting unit 33, and there is subjected to D/A conversion to analog voice signals. The voice signals are supplied to the speaker 18, thereby outputting the synthesized sound corresponding to the text input to the text generating unit 31.

The voice synthesizing unit 55 thus configured receives supply of action instruction information containing text which is the object of voice synthesizing from the action determining mechanism unit 52, also receives supply of the state of emotions and instincts from the emotion/instinct model unit 51, and further receives supply of action information from the action determining mechanism unit 52, and the text generating unit 31 and rules synthesizing unit 32 perform voice synthesizing processing taking the state of emotions and instincts and the action information into consideration.

Figure 12:
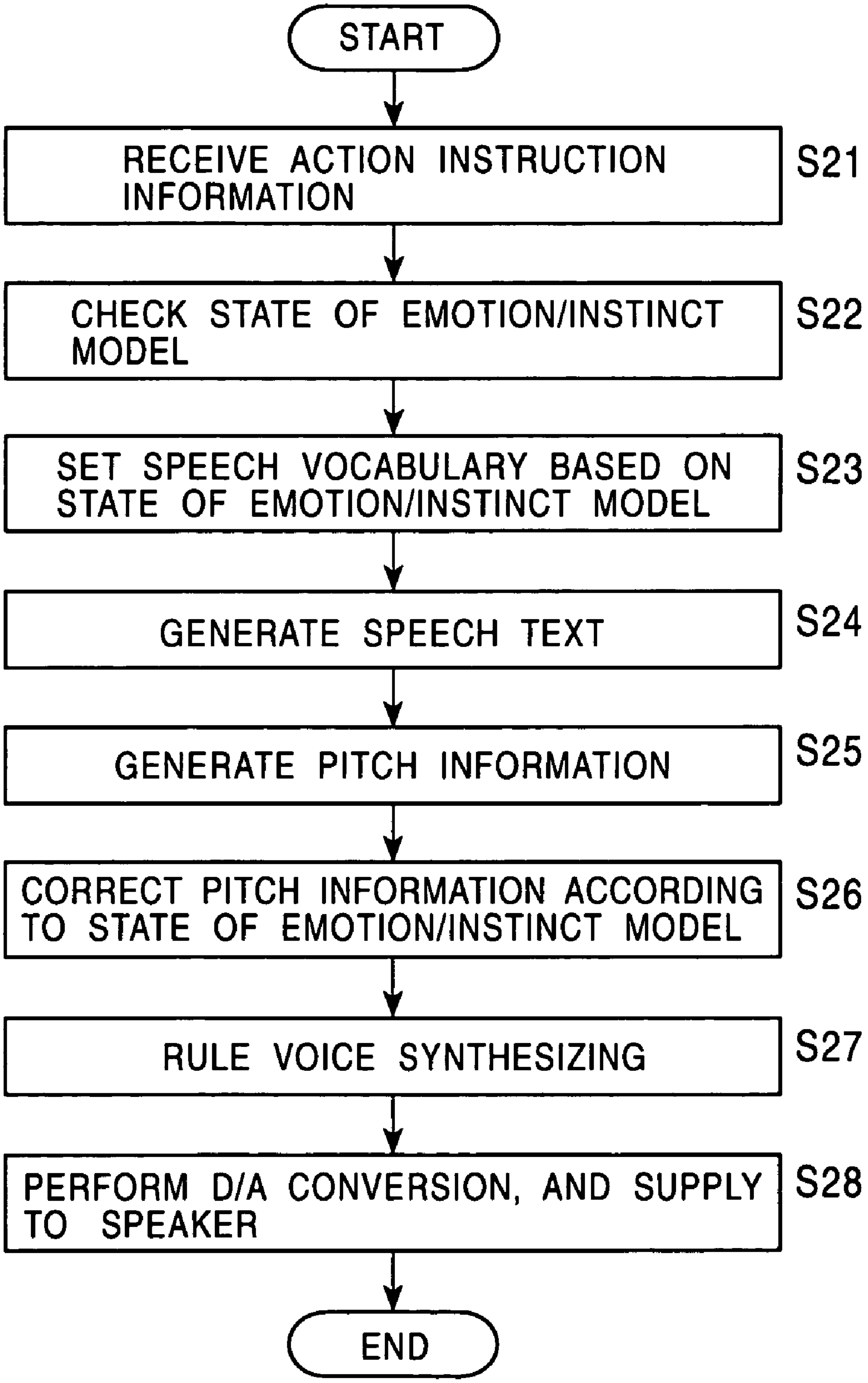
FIG. 12 is a flowchart describing the processing of the voice synthesizing unit 55.

Now, the voice synthesizing processing performed while taking the state of emotions and instincts into consideration will be described, with reference to the flowchart in FIG. 12.

At the point that the action determining mechanism unit 52 outputs the action instruction information containing text which is the object of voice synthesizing to the voice synthesizing unit 55, the text generating unit 31 receives the action instruction information in step S21, and the flow proceeds to step S22. At step S22, the state of emotions and instincts of the robot is recognized in step S22 in the text generating unit 31 and rules synthesizing unit 32 by making reference to the emotion/instinct model unit 51, and the flow proceeds to step S23.

In step S23, at the text generating unit 31, the vocabulary (speech vocabulary) used for generating text to be actually output as synthesized sound (hereafter also referred to as "speech text") is set from the text contained in the action instruction information from the action determining mechanism unit 52, based on the emotions and instincts of the robot, and the flow proceeds to step S24. In step S24, at the text generating unit 31, speech text corresponding to the text contained in the action instruction information is generated using the speech vocabulary set in step S23.

That is, the text contained in the action instruction information from the action determining mechanism unit 52 is such that presupposes speech in a standard state of emotions and instincts, and in step S24 the text is corrected taking into consideration the state of emotions and instincts of the robot, thereby generating speech text.

Specifically, in the event that the text contained in the action instruction information is "What is it?" for example, and the emotion state of the robot represents "angry", the text is generated as speech text of "Yeah, what?" to indicate anger. Also, in the event that the text contained in the action instruction information is "Please stop" for example, and the emotion state of the robot represents "angry", the text is generated as speech text of "Quit it!" to indicate anger.

Then, the flow proceeds to step S25, the text generating unit 31 performs text analysis of the speech text such as morpheme analysis and grammatical structure analysis, and generates pitch information such as pitch frequency, power, duration, etc., serving as information necessary for performing rule voice synthesizing regarding the speech text. Further, the text generating unit 31 also generates phonemics information such as the pronunciation of each work making up the speech text. Here, in step S25, standard phonemics information is generated for the phonemics information of the speech text.

Subsequently, in step S26, the text generating unit 31 corrects the phonemics information of the speech text set in step S25 based on the state of emotions and instincts of the robot, thereby giving greater emotional expressions at the point of outputting the speech text as synthesized sound.

Now, the details of the relation between emotion and speech are described in, e.g., "conveyance of Paralinguistic Information by Speech: From the Perspective of Linguistics", MAEKAWA, Acoustical Society of Japan 1997 Fall Meeting Papers Vol. 1-3-10, pp. 381–384, September 1997, etc.

The phonemics information and pitch information of the speech text obtained at the text generating unit 31 is supplied to the rules synthesizing unit 32, and in step S27, at the rules synthesizing unit 32, rule voice synthesizing is performed following the phonemics information and pitch information, thereby generating digital data of the synthesized sound of the speech text. Now, at the rules synthesizing unit 32 also, pitch such as the position of pausing, the position of accent, intonation, etc., of the synthesized sound, is changed so as to appropriately express the state of emotions and instincts of the robot, based on the state of emotions and instincts thereof.

The digital data of the synthesized sound obtained at the rules synthesizing unit 32 is supplied to the D/A converting unit 33. In step S28, at the D/A converting unit 33, digital data from the rules synthesizing unit 32 is subjected to D/A conversion, and supplied to the speaker 18, thereby ending processing. Thus, synthesized sound of the speech text which has pitch reflecting the state of emotions and instincts of the robot is output from the speaker 18.

Figure 13:
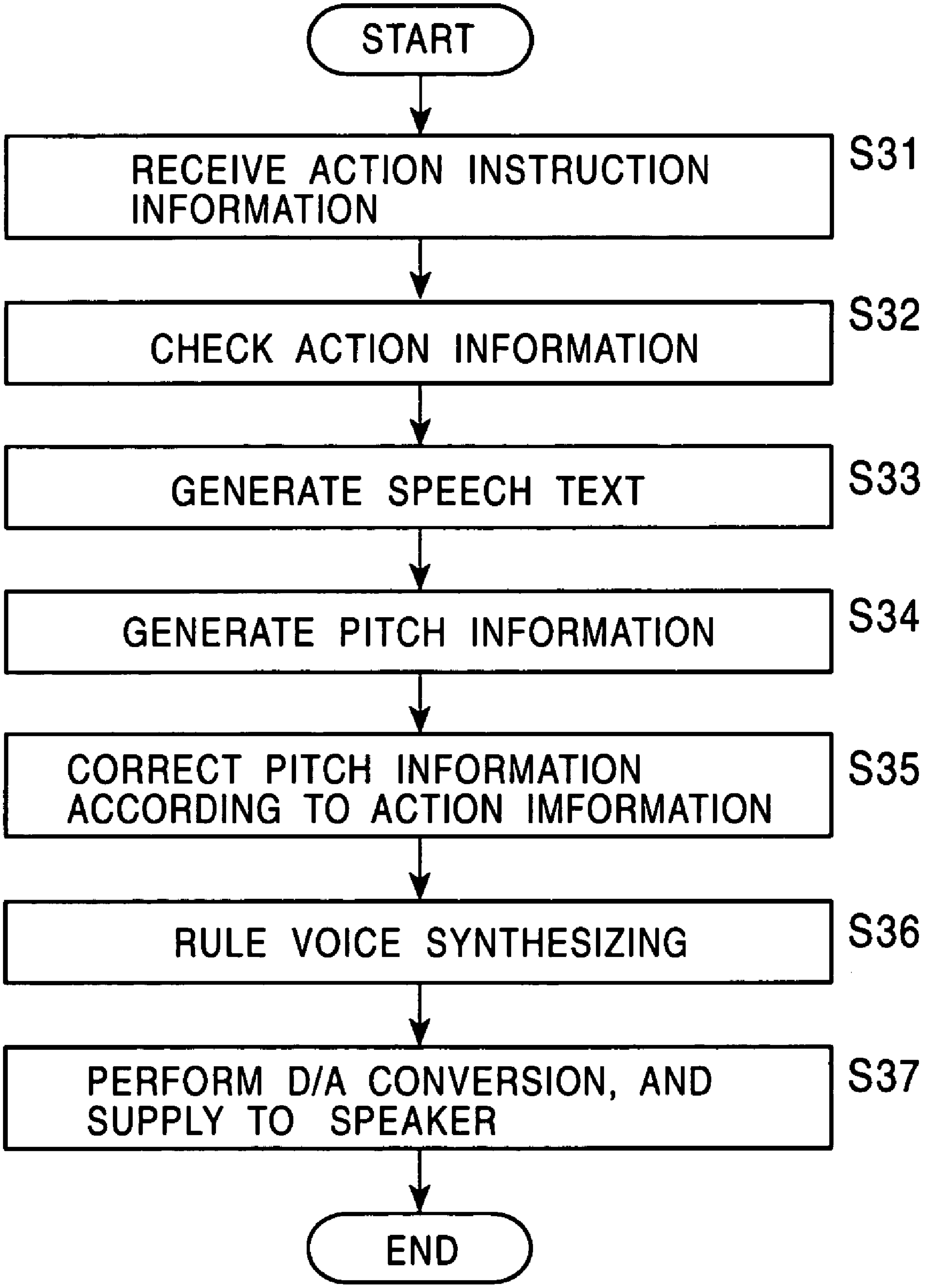
FIG. 13 is also a flowchart describing the processing of the voice synthesizing unit 55.

Next, the voice synthesizing processing which is performed taking into account the action information will be described with reference to the flowchart in FIG. 13.

At the point that the action determining mechanism unit 52 outputs the action instruction information containing text which is the object of voice synthesizing to the voice synthesizing unit 55, the text generating unit 31 receives the action instruction information in step S31, and the flow proceeds to step S32. At step S32, the current action of the robot is confirmed in the text generating unit 31 and rules synthesizing unit 32 by making reference to the action information output by the action determining mechanism unit 52, and the flow proceeds to step S33.

In step S33, at the text generating unit 31, the vocabulary (speech vocabulary) used for generating speech text is set from the text contained in the action instruction information from the action determining mechanism unit 52, based on action information, and speech text corresponding to the text contained in the action instruction information is generated using the speech vocabulary.

Then the flow proceeds to step S34, the text generating unit 31 performs morpheme analysis and grammatical structure analysis of the speech text, and generates pitch information such as pitch frequency, power, duration, etc., serving as information necessary for performing rule voice synthesizing regarding the speech text. Further, the text generating unit 31 also generates phonemics information such as the pronunciation of each work making up the speech text. Here, in step S34 as well, standard pitch information is generated for the pitch information of the speech text, in the same manner as with step S25 in FIG. 12.

Subsequently, in step S35, the text generating unit 31 corrects the pitch information of the speech text generated in step S25 based on the action information.

That is, in the event that the robot is walking, for example, there is noise from the driving of the actuators 3$AA_1$ through 5$A_1$ and 5$A_2$ as described above. On the other hand, in the event that the robot is sitting or lying prostrate, there is no such noise. Accordingly, the synthesized sound is harder to hear in the event that the robot is walking, in comparison to cases wherein the robot is sitting or lying prostrate.

Thus, in the event that the action information indicates the robot is walking, the text generating unit 31 corrects the pitch information so as to slow the speech speed of the synthesized sound or increase the power thereof, thereby making the synthesized sound more readily understood.

In other arrangements, correction may be made in step S35 such that the pitch frequency value differs depending on whether the action information indicates that the robot is on its side or standing.

The phonemics information and pitch information of the speech text obtained at the text generating unit 31 is supplied to the rules synthesizing unit 32, and in step S36, at the rules synthesizing unit 32, rule voice synthesizing is performed following the phonemics information and pitch information, thereby generating digital data of the synthesized sound of the speech text. Now, at the rules synthesizing unit 32 also, the position of pausing, the position of accent, intonation, etc., of the synthesized sound, is changed as necessary, at the time of rule voice synthesizing.

The digital data of the synthesized sound obtained at the rules synthesizing unit 32 is supplied to the D/A converting unit 33. In step S37, at the D/A converting unit 33, digital data from the rules synthesizing unit 32 is subjected to D/A conversion, and supplied to the speaker 18, thereby ending processing.

Incidentally, in the event of generating synthesized sound at the voice synthesizing unit 55 taking into consideration the state of emotions and instincts, and the action information, the output of such synthesized sound and the actions of the robot may be synchronized in a way.

That is, for example, in the event that the emotion state represents "not angry", and the synthesized sound "What is it?" is to be output taking the state of emotion into consideration, the robot may be made to face the user in a manner synchronous with the output of the synthesized sound. On the other hand, for example, in the event that the emotion state represents "angry", and the synthesized sound "Yeah, what?" is to be output taking the state of emotion into consideration, the robot may be made to face the other way in a manner synchronous with the output of the synthesized sound.

Also, an arrangement may be made wherein, in the event of output of the synthesized sound "What is it?", the robot is made to act at normal speed, and wherein in the event of output of the synthesized sound "Yeah, what?", the robot is made to act at a speed slower than normal, in a sullen and unwilling manner.

In this case, the robot can express emotions to the user with both motions and synthesized sound.

Further, at the action determining mechanism unit 52, the next action is determined based on an action model represented by a finite automaton such as shown in FIG. 6, and the contents of the text output as synthesized sound can be correlated with the transition of state in the action model in FIG. 6.

That is, for example, in the event of making transition from the state corresponding to the action "sitting" to the state corresponding to the action "standing", a text such as "Here goes!" can be correlated thereto. In this case, in the event of the robot making transition from a sitting position to a standing position, the synthesized sound "Here goes!" can be output in a manner synchronous with the transition in position.

As described above, a robot with a high entertainment nature can be provided by controlling the voice synthesizing processing and voice recognizing processing, based on the state of the robot.

Figure 14:
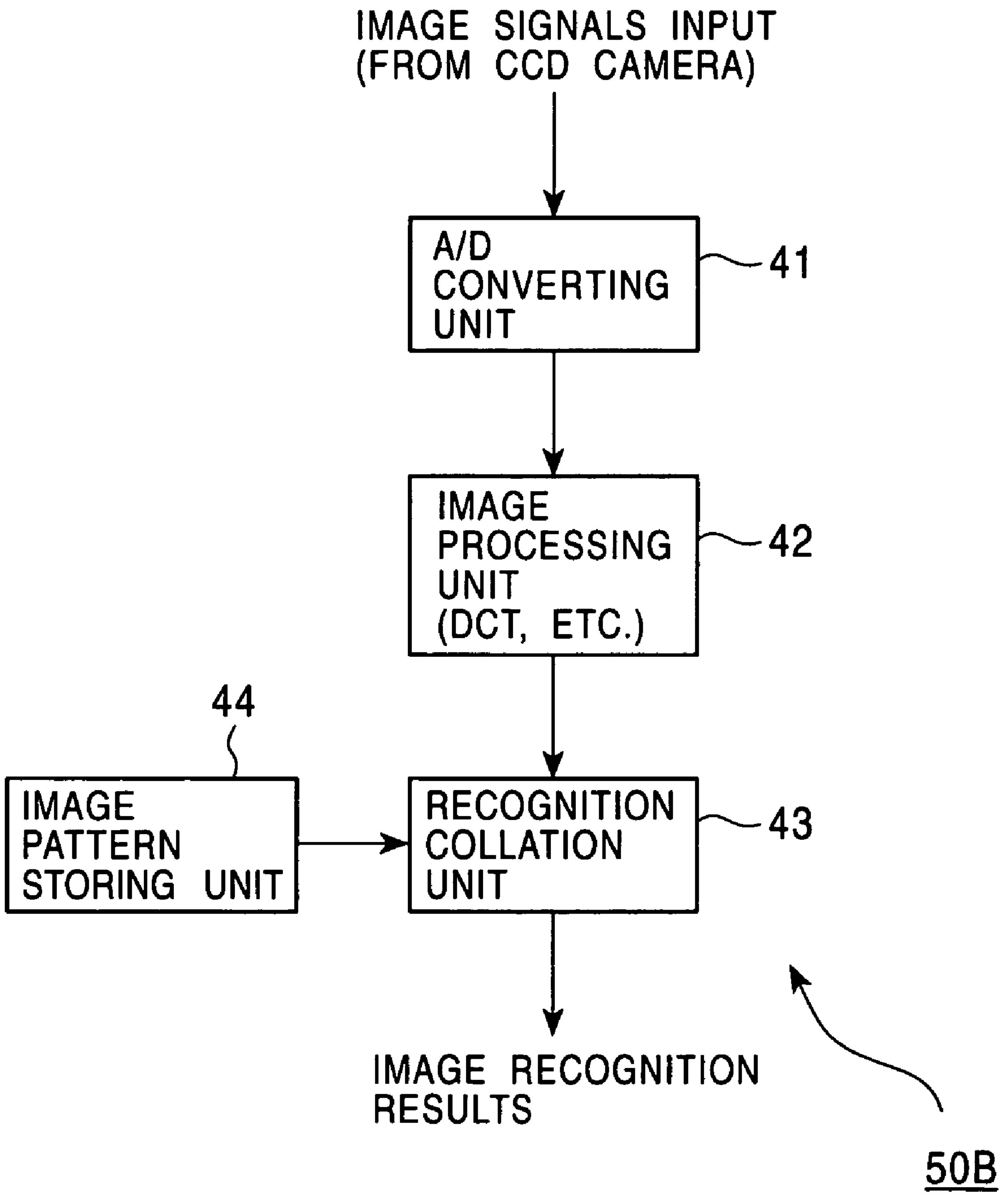
FIG. 14 is a block diagram illustrating a configuration example of the image recognizing unit 50B.

Next, FIG. 14 illustrates a configuration example of the image recognizing unit 50B making up the sensor input processing unit 50 shown in FIG. 3.

Image signals output from the CCD camera are supplied to the A/D converting unit 41, and there subjected to A/D conversion, thereby becoming digital image data. This digital image data is supplied to the image processing unit 42. At the image processing unit 42, predetermined image processing such as DCT (Discrete Cosine Transform) and the like for example is performed to the image data from the A/D converting unit 41, and this is supplied to the recognition collation unit 43.

The recognition collation unit 43 calculates the distance between each of multiple image patterns stored in the image pattern storing unit 44, and the output of the image processing unit 42, and detect the image pattern with the smallest distance. Then, the recognition collation unit 43 recognizes the image taken with the CCD camera 16, and outputs the recognition results as state recognition information to the emotion/instinct model unit 51 and action determining mechanism unit 52, based on the detected image pattern.

Now, the configuration shown in the block diagram in FIG. 3 is realized by the CPU 10A executing control programs, as described above. Now, taking only the power of the CPU 10A (hereafter also referred to simply as "CPU power") into consideration as a resource necessary for realizing the voice recognizing unit 50A, the CPU power is determined singly by the hardware employed for the CPU 10A, and the processing amount (the processing amount per unit time) which can be executed by the CPU power is also determined singly.

On the other hand, in the processing to be executed by the CPU 10A, there is processing which should be performed with priority over the voice recognition processing (hereafter also referred to as "priority processing"), and accordingly, in the event that the load of the CPU 10A for priority processing increases, the CPU power which can be appropriated to voice recognition processing decreases.

Figure 15:
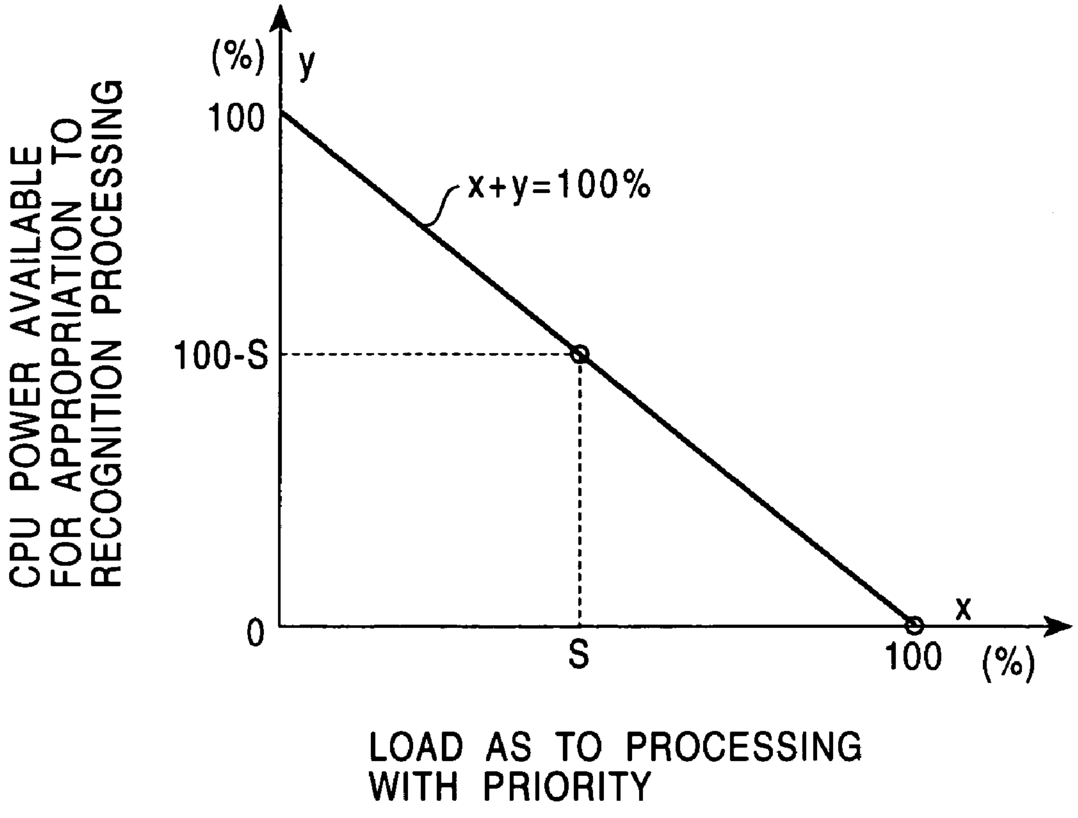
FIG. 15 is a diagram illustrating the relationship between the load regarding priority processing, and the CPU power which can be appropriated to voice recognizing processing.

That is, representing the load on the CPU 10A regarding priority processing as x %, and representing the CPU power which can be appropriated to voice recognition processing as y %, the relation between x and y is represented by the expression $$x+y=100\%$$

and is as shown in FIG. 15.

Accordingly, in the event that the load for priority processing is 0%, 100% of the CPU power can be appropriated to voice recognition processing. Also, in the event that the load regarding priority processing is S (0<S<100)%, 100-S % of the CPU power can be appropriated. Also, in the event that the load for priority processing is 100%, no CPU power can be appropriated to voice recognition processing.

Now, for example, in the event that the robot is walking for example, and CPU power appropriated to the processing for the action of "walking" (hereafter also referred to as "walking processing") is insufficient, the walking speed becomes slow, and in a worst scenario, the robot may stop walking. Such slowing or stopping while walking is unnatural to the user, so there is the need to prevent such a state if at all possible, and accordingly, it can be said that the walking processing performed while the robot is walking must be performed with priority over the voice recognition processing.

That is, in the event that the processing currently being carried out is obstructed by voice recognition processing being performed and the movement of the robot is no longer smooth due to this, the user will sense that this is unnatural. Accordingly, is can be said that basically, the processing being currently performed must be performed with priority over the voice recognition processing, and that voice recognition processing should be performed within a range so as to not obstruct the processing being currently performed.

To this end, the action determining mechanism unit 52 is arranged so as to recognize the action being currently taken by the robot, and controlling voice recognition processing by the voice recognizing unit 50A, based on the load corresponding to the action.

Figure 16:
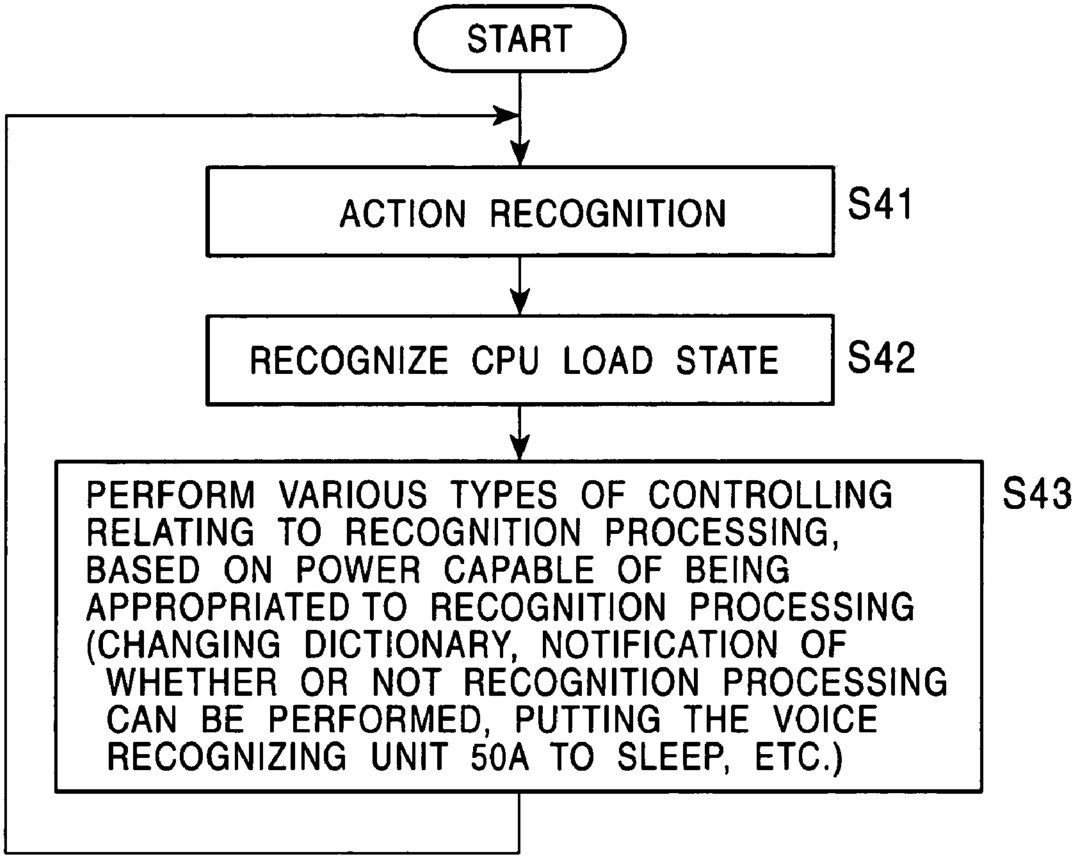
FIG. 16 is a flowchart describing the processing of the action determining mechanism unit 52.

That is, as shown in the flowchart in FIG. 16, in step S41, the action determining mechanism unit 52 recognizes the action being taken by the robot, based on the action model which it itself manages, and the flow proceeds to step S42. In step S42, the action determining mechanism unit 52 recognizes the load regarding the processing for continuing the current action recognized in step S41 in the same manner (i.e., maintaining the action).

Now, the load corresponding to the processing for continuing the current action in the same manner can be obtained by predetermined calculations. Also, the load can also be obtained by preparing beforehand the a table correlating actions and estimated CPU power for performing processing corresponding to the actions, and making reference to the table. Note that less processing amount is required for the table than for calculation.

Following obtaining the load corresponding to the processing for continuing the current action in the same manner, the flow proceeds to step S43, and the action determining mechanism unit 52 obtains the CPU power which can be appropriated to voice recognizing processing, based on the load, from the relationship shown in FIG. 15. Further, the action determining mechanism unit 52 performs various types of control relating to voice recognizing processing based on the CPU power which can be appropriated to the voice recognizing processing, the flow returns to step S41, and subsequently the same processing is repeated.

That is, the action determining mechanism unit 52 changes the word dictionaries used for voice recognizing processing, based on the CPU power which can be appropriated to the voice recognizing processing. Specifically, in the event that sufficient CPU power can be appropriated to the voice recognizing processing, settings are made such that dictionaries with a great number of words registered therein are used for voice recognizing processing. Also, in the event that sufficient CPU power cannot be appropriated to the voice recognizing processing, settings are made such that dictionaries with few words registered therein are used for voice recognizing.

Further, in the event that practically no CPU power can be appropriated to voice recognizing processing, the action determining mechanism unit 52 puts the voice recognizing unit 50A to sleep (a state wherein no voice recognizing processing is performed).

Also, the action determining mechanism unit 52 causes the robot to take actions corresponding to the CPU power which can be appropriated to voice recognizing processing.

That is, in the event that practically no CPU power can be appropriated to voice recognizing processing, or in the event that sufficient CPU power cannot be appropriated thereto, no voice recognizing processing is performed, or the voice recognizing precision and processing speed may deteriorate, giving the user an unnatural sensation.

Accordingly, in the event that practically no CPU power can be appropriated to voice recognizing processing, or in the event that sufficient CPU power cannot be appropriated thereto, the action determining mechanism unit 52 causes the robot to take listless actions or actions such as cocking the head, thereby notifying the user that voice recognition is difficult.

Also, in the event that sufficient CPU power can be appropriated to voice recognizing processing, the action determining mechanism unit 52 causes the robot to take energetic actions or actions such as nodding the head, thereby notifying the user that voice recognition is sufficiently available.

In addition to the robot taking such as actions as described above to notify the user whether voice recognition processing is available or not, arrangements may be made wherein special sounds such as "beep—beep—beep" or "tinkle—tinkle—tinkle", or predetermined synthesized sound messages, are output from the speaker 18.

Also, in the event that the robot has a liquid crystal panel, the user can be notified regarding whether voice recognition processing is available or not by displaying predetermined messages on the liquid crystal panel. Further, in the event that the robot has a mechanism by expressing facial expressions such as blinking and so forth, the user can be notified regarding whether voice recognition processing is available or not by such changes in facial expressions.

Note that while in the above case, only the CPU power has been dealt with, but other resources for voice recognition processing (e.g., available space on the memory 10B, etc.) may be the object of such managing.

Further, in the above, description has been made with focus on the relation between voice recognition processing at the voice recognizing unit 50A and other processing, but the same can be said regarding the relation between image recognizing processing at the image recognizing unit 50B and other processing, voice synthesizing processing at the voice synthesizing unit 55 and other processing, and so forth.

The above has been a description of an arrangement wherein the present invention has been applied to an entertainment robot (i.e., a robot serving as a pseudo pet), but the present invention is by no means restricted to this application; rather, the present invention can be widely applied to various types of robots, such as industrial robots, for example.

Further, in the present embodiment, the above-described series of processing is performed by the CPU 10A executing programs, by the series of processing may be carried out by dedicated hardware for each.

Also, in addition to storing the programs on the memory 10B (see FIG. 2) beforehand, the programs may be temporarily or permanently stored (recorded) on removable recording media such as floppy disks, CD-ROM (Compact Disk Read-Only Memory), MO (Magneto-Optical) disks, DVDs (Digital Versatile Disk), magnetic disks, semiconductor memory, etc. Such removable recording mediums may be provided as so-called packaged software, so as to be installed in the robot (memory 10B).

Also, in addition to installing the programs from removable recording media, arrangements may be made wherein the programs are transferred from a download site in a wireless manner via a digital broadcast satellite, or by cable via networks such as LANs (Local Area Networks) or the Internet, and thus installed to the memory 10B.

In this case, in the event that a newer version of the program is released, the newer version can be easily installed to the memory 10B.

Now, in the present specification, the processing steps describing the program for causing the CPU 10A to perform various types of processing do not necessarily need to be processed in the time-sequence following the order described in the flowcharts; rather, the present specification includes arrangements wherein the steps are processed in parallel or individually (e.g., parallel processing or processing by objects).

Also, the programs may be processed by a single CPU, or the processing thereof may be dispersed between multiple CPUs and thus processed.

What is claimed is:

1. A speech processing device built into a robot, said speech processing device comprising:

speech processing means for processing a speech input including extracting control pitch information or phonemics information; and control means for controlling speech processing by said speech processing means, based on a state of said robot; wherein the state is determined by an action, an emotion state, and an instinct state of the robot;

wherein said emotion and instinct states are determined on the basis of values corresponding to a plurality of states of an emotion model and an instinct model, respectively; wherein the value corresponding to each state within the emotion model and within the instinct model are linked in a mutually stimulating manner and changed based on said control pitch information or said phonemics information;

wherein said speech processing means comprises speech recognizing means for recognizing the speech input;

and wherein said robot takes actions corresponding to a reliability of the speech recognition results output from said speech recognizing means, or the emotion state of said robot is changed based on said reliability.

2. The speech processing device according to claim 1, wherein said speech processing means comprises speech synthesizing means for performing speech synthesizing processing and outputting synthesized sound;

and wherein said control means control the speech synthesizing processing by said speech synthesizing means, based on the state of said robot.

3. The speech processing device according to claim 2, wherein said control means control phonemics information and pitch information output by said speech synthesizing means.

4. The speech processing device according to claim 2, wherein said control means control the speech speed or volume of synthesized sound output by said speech synthesizing means.

5. The speech processing device according to claim 1, wherein said control means recognizes the action which said robot is taking, and controls speech processing by said speech processing means based on the load regarding that action.

6. The speech processing device according to claim 5, wherein said robot takes actions corresponding to resources which can be appropriated to speech processing by said speech processing means.

7. A speech processing method for a speech processing device built into a robot, said method comprising:

a speech processing step for processing a speech input including extracting control pitch information or phonemics information; and a control step for controlling speech processing in said speech processing step, based on the state of said robot; wherein the state is determined by an action, an emotion state, and an instinct state of the robot;

wherein said emotion and instinct states are determined on the basis of values corresponding to a plurality of states of an emotion model and an instinct model, respectively; wherein the value corresponding to each state within the emotion model and within the instinct model are linked in a mutually stimulating manner and changed based on said control pitch information or said phonemics information;

wherein said speech processing step performs a speech recognizing step of recognizing the speech input;

and wherein said robot takes actions corresponding to a reliability of the speech recognition results output from said speech recognizing step, or the emotion state of said robot is changed based on said reliability.

8. A recording medium recording programs to be executed by a computer, for causing a robot to perform speech processing, said program comprising:

a speech processing step for processing a speech input including extracting control pitch information or phonemics information; and a control step for controlling speech processing in said speech processing step, based on the state of said robot;

wherein the state is determined by an action, an emotion state, and an instinct state of the robot;

wherein said emotion and instinct states are determined on the basis of values corresponding to a plurality of states of an emotion model and an instinct model, respectively; wherein the value corresponding to each state within the emotion model and within the instinct model are linked in a mutually stimulating manner and changed based on said control pitch information or said phonemics information;

wherein said speech processing step performs a speech recognizing step of recognizing the speech input;

and wherein said robot takes actions corresponding to a reliability of the speech recognition results output from said speech recognizing step, or the emotion state of said robot is changed based on said reliability.

* * * * *